United States Patent [19]

Holdridge et al.

[11] Patent Number: 4,462,390

[45] Date of Patent: Jul. 31, 1984

[54] MODULAR SOLAR GREENHOUSE WITH ELEVATED OVERHEAD HEAT STORAGE MATERIAL AND MOVABLE INSULATION BARRIERS AND METHOD AND SYSTEM FOR SOLAR HEATING OF ATTACHED LIVING SPACE USING THERMOSTAT-CONTROLLED AIR CIRCULATION FOR HARVESTING HEAT

[76] Inventors: Robert B. Holdridge, P.O. Box 167, Silver St.; Douglas C. Taff, P.O. Box 85, both of Hinesburg, Vt. 05461; William F. Yanda, 460 S. Prospect St., Burlington, Vt. 05401

[21] Appl. No.: 312,114

[22] Filed: Oct. 16, 1981

[51] Int. Cl.³ .............................................. F24J 3/02
[52] U.S. Cl. ................................. 126/430; 126/419; 126/422; 126/450; 126/400; 52/80; 52/82; 47/17
[58] Field of Search ............... 126/428, 430, 431, 432, 126/400, 450, 443, 417, 419, 436, 435, 422; 62/235.1; 47/17; 237/2 R, 2 B; 52/80, 82, 90

[56] References Cited

U.S. PATENT DOCUMENTS

| | | | |
|---|---|---|---|
| 4,018,213 | 4/1977 | Mann, Jr. | 126/431 |
| 4,176,653 | 12/1979 | Pittman | 126/400 |
| 4,289,116 | 9/1981 | Williams | 126/431 |
| 4,378,787 | 4/1983 | Fleischmann | 126/435 |

FOREIGN PATENT DOCUMENTS 2558791 7/1977 Fed. Rep. of Germany ..... 62/235.1

Primary Examiner—James C. Yeung
Attorney, Agent, or Firm—Parmelee, Bollinger & Bramblett

[57] ABSTRACT

A modular solar greenhouse incorporates rigid curving frames overhead with screw and nut tracks for ease of assembly and east side and west side end modules and advantageously employs a thermally broken glazing system; that is, the exterior and interior portions of the aluminum frame extrusions are bonded together by strong plastic material and then the metal bridge is removed for thermally isolating the interior frame portion from the exterior portion. At least one overhead heat storage unit is carried by the rigid frames, with insulated roofing being located above and also being supported by the frames, so that low-angle solar radiation in the wintertime can travel directly into the upper region of the greenhouse below the roof for directly impinging upon and supplying heat energy to the thermal storage units. Movable, reflective insulation barriers or curtains are extendible for enclosing the solar greenhouse for retaining warmth resulting from stored solar heat energy in the overhead storage units during winter nights.

22 Claims, 21 Drawing Figures

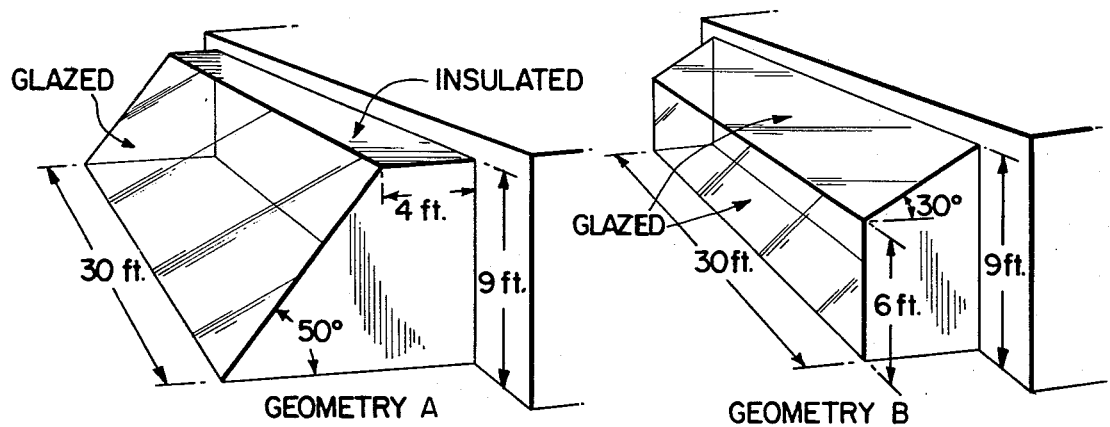
FIG. 1
(PRIOR ART)
FIG. 2
(PRIOR ART)
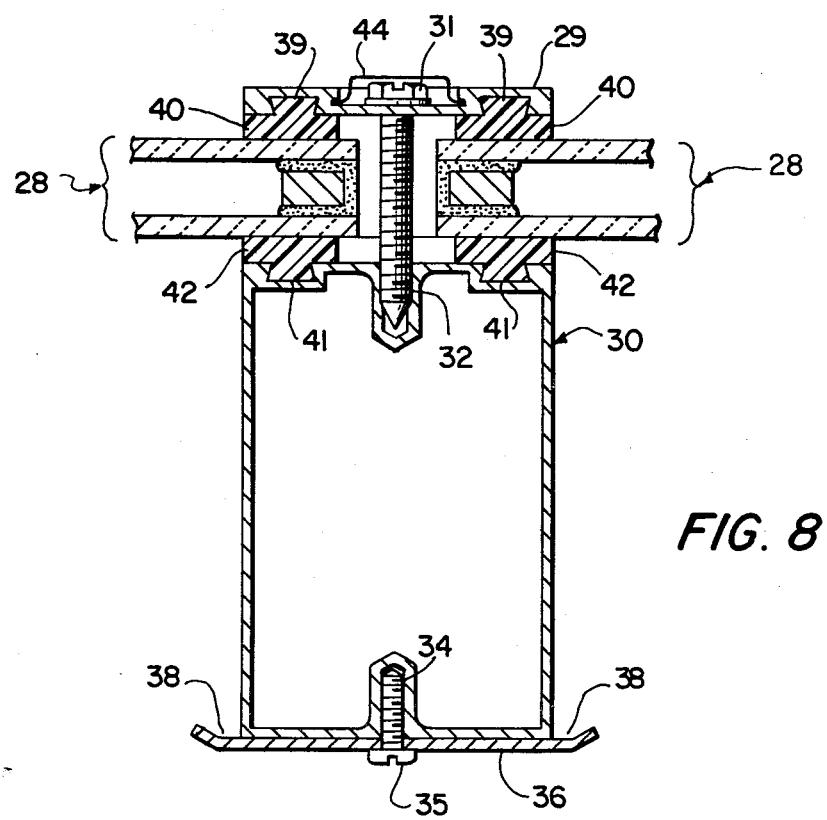
FIG. 8

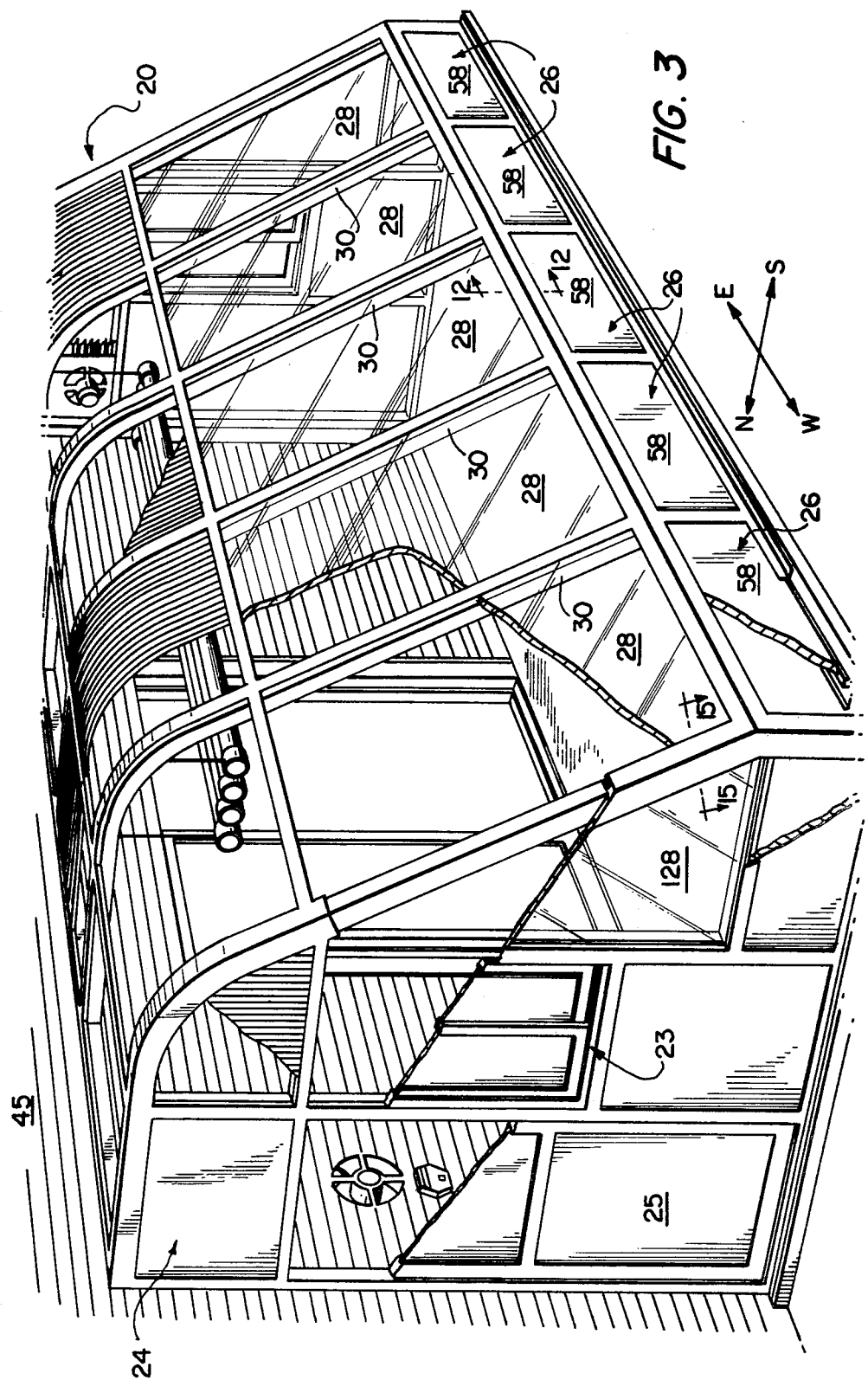

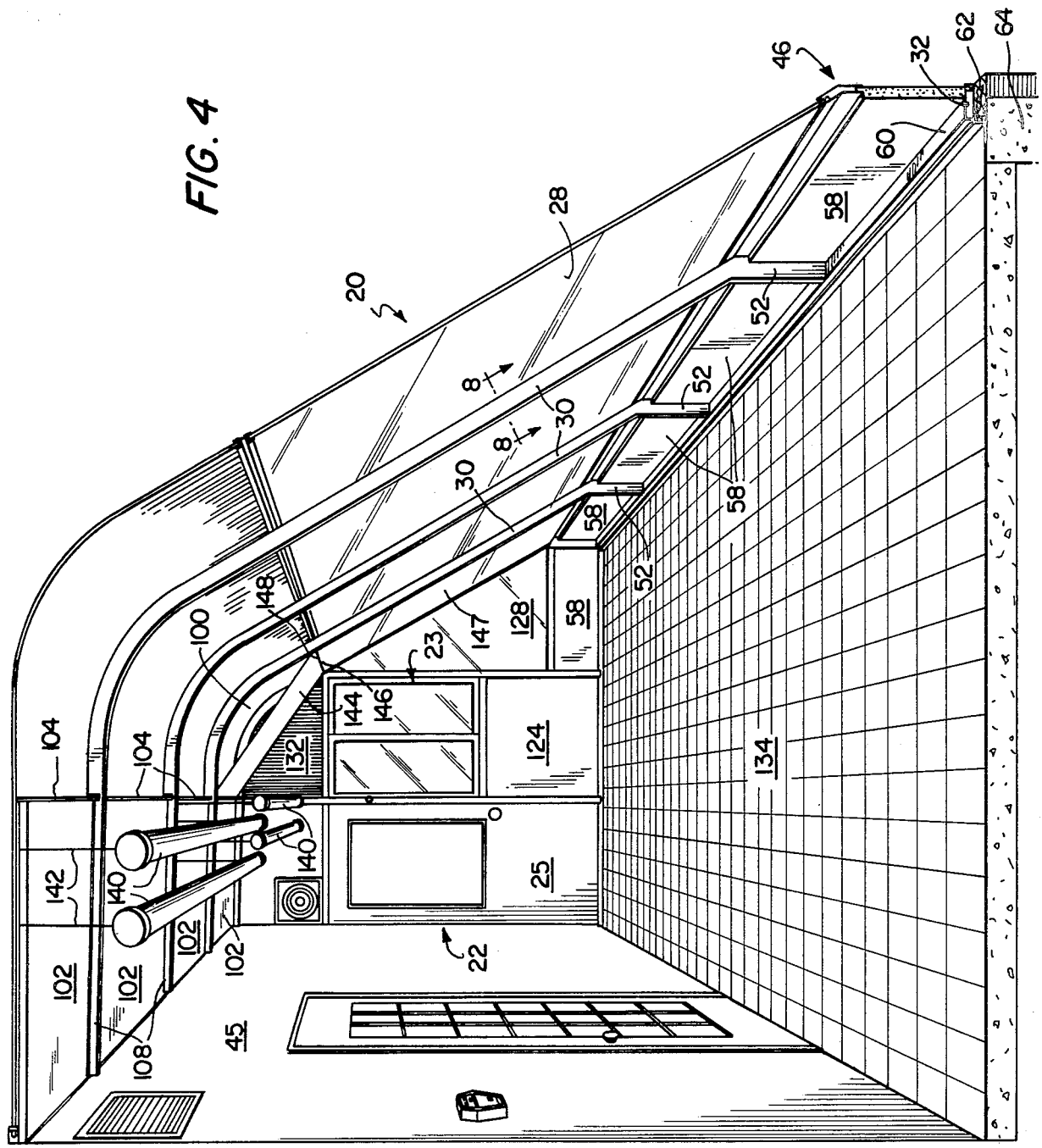

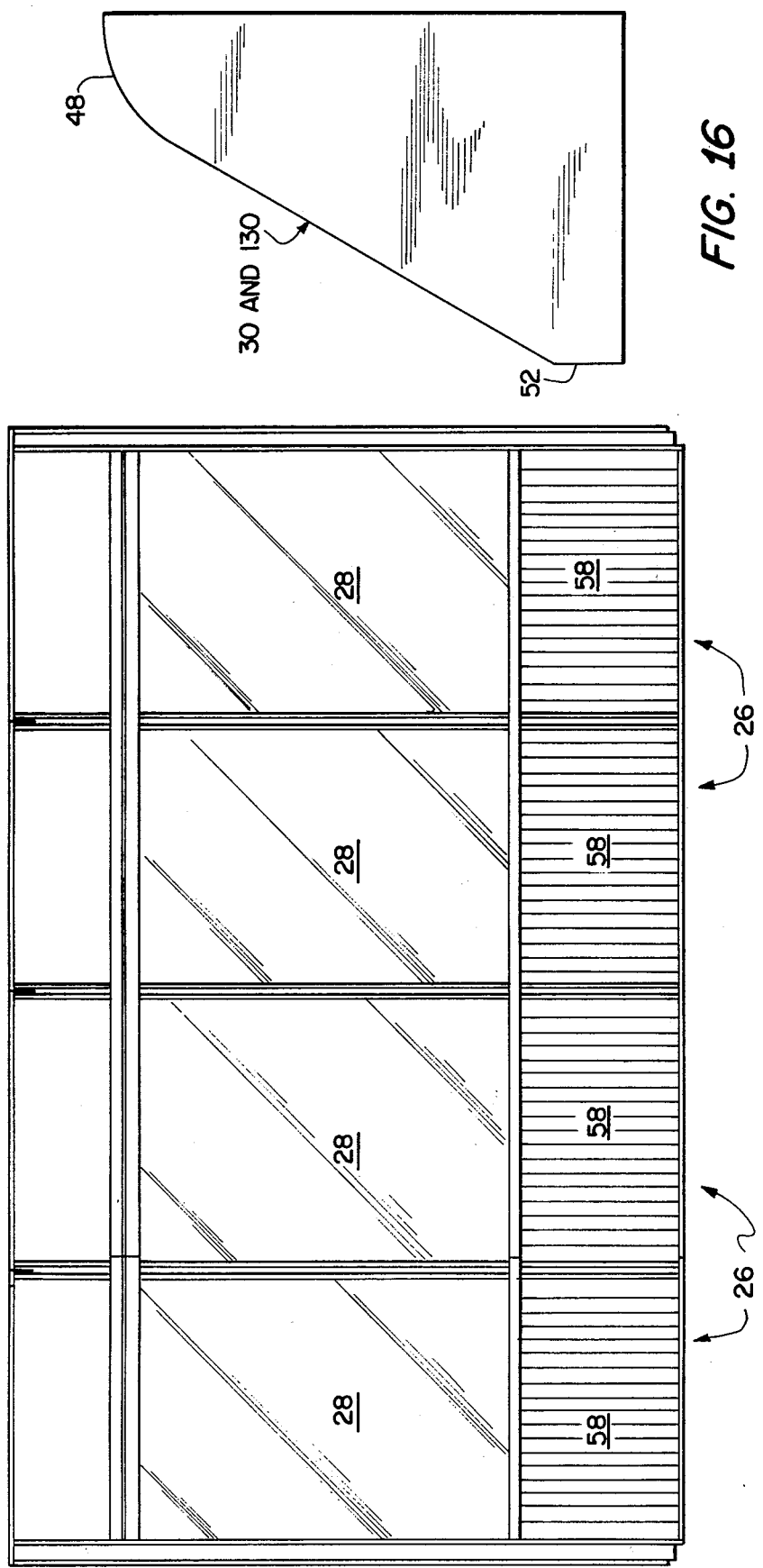

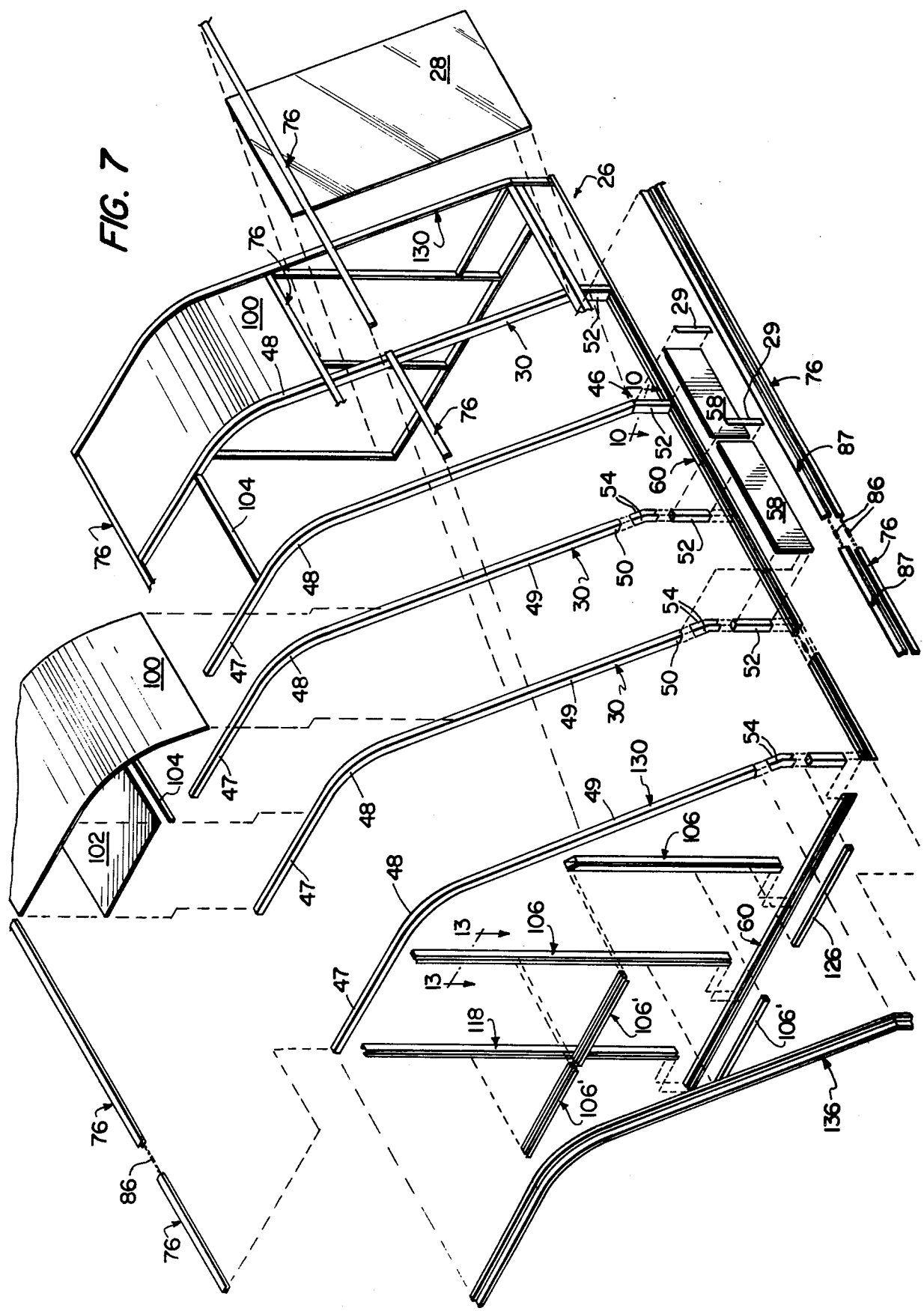

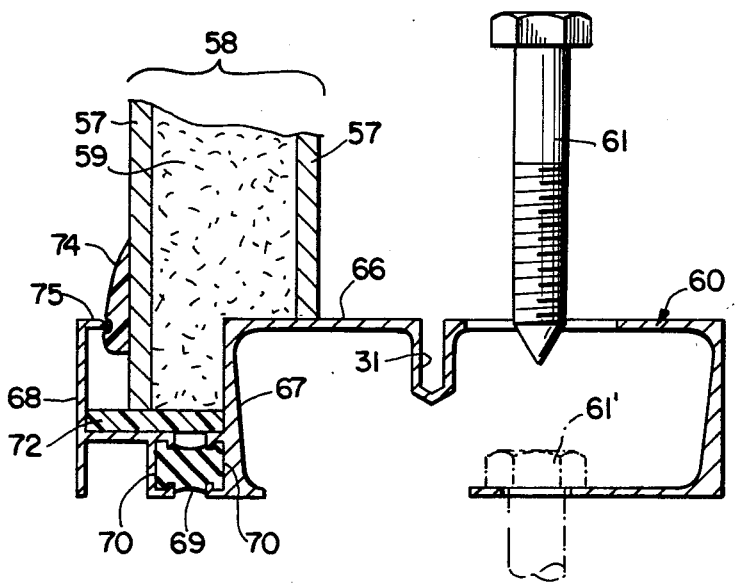
FIG. 11
FIG. 11A
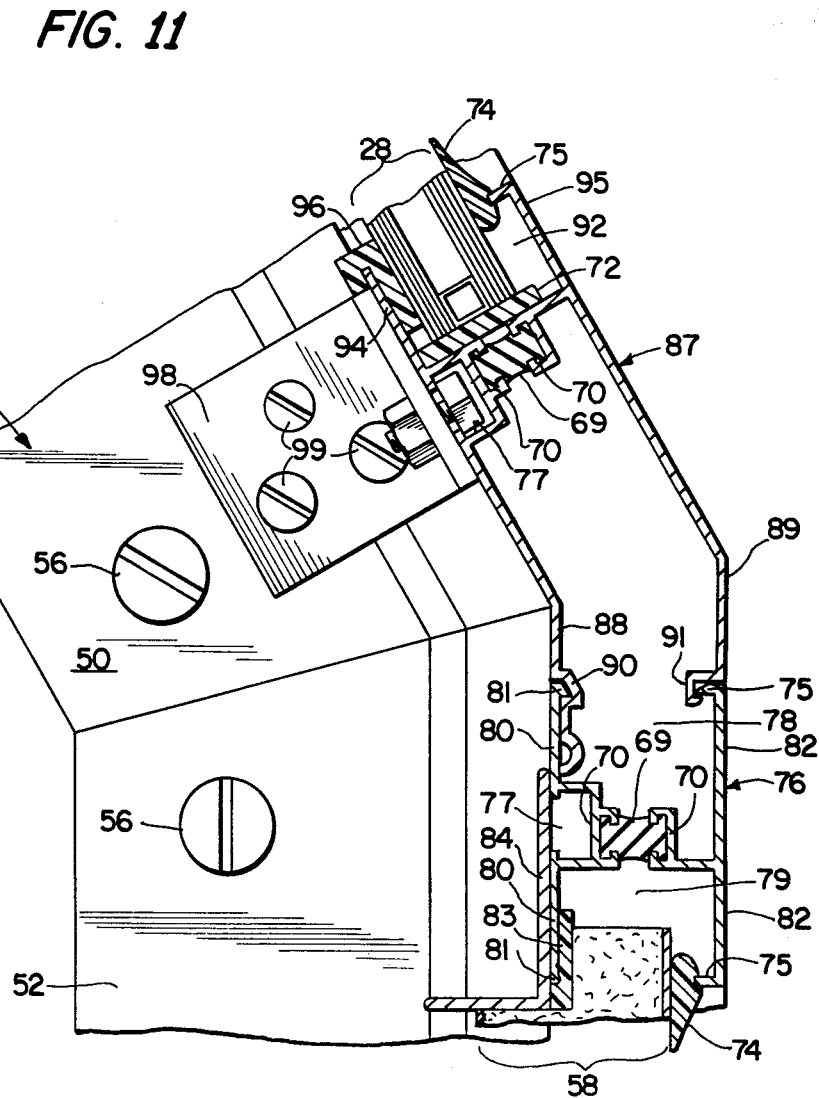
FIG. 12

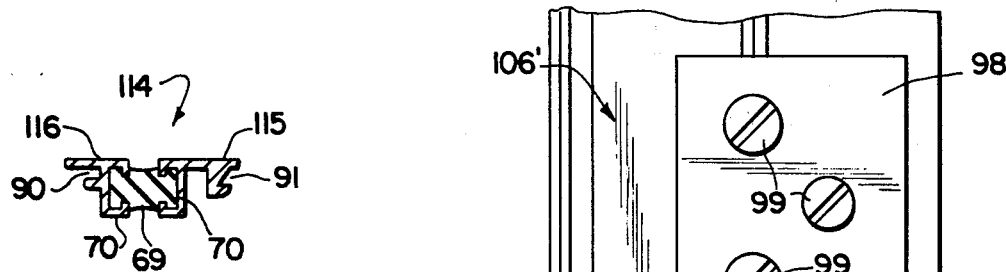
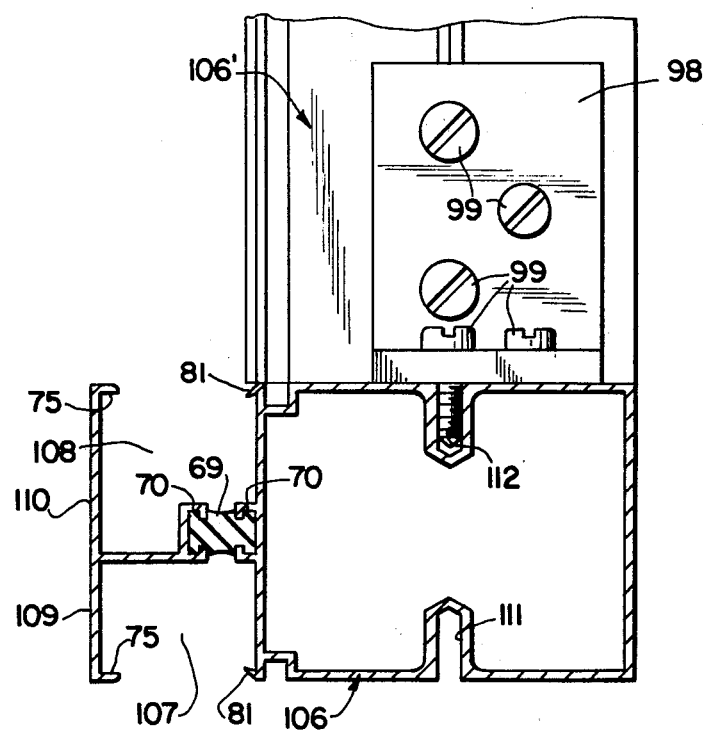
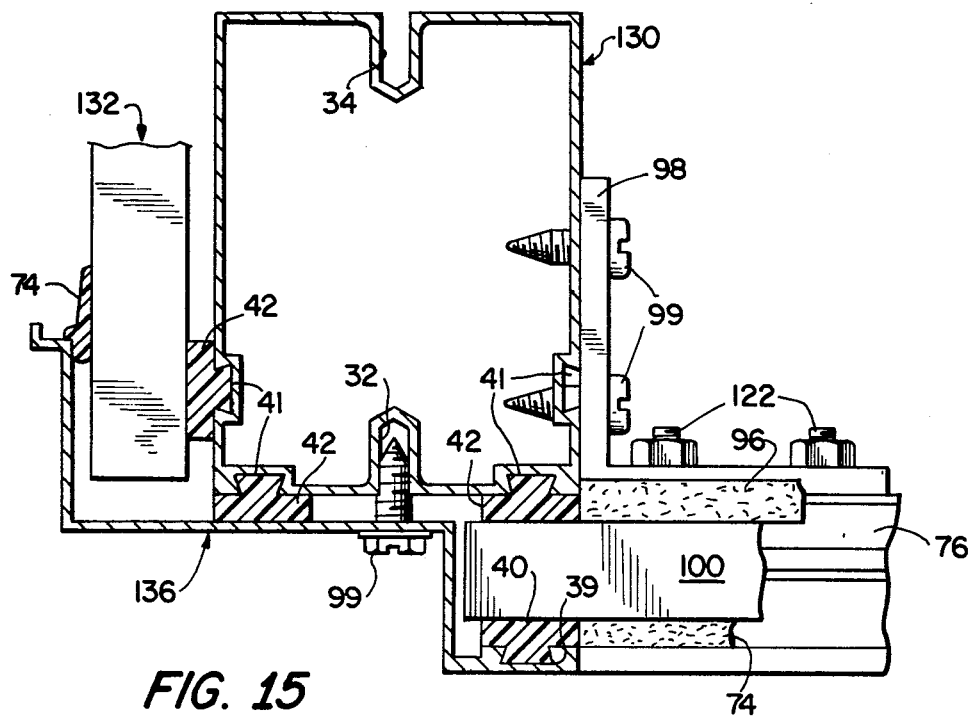

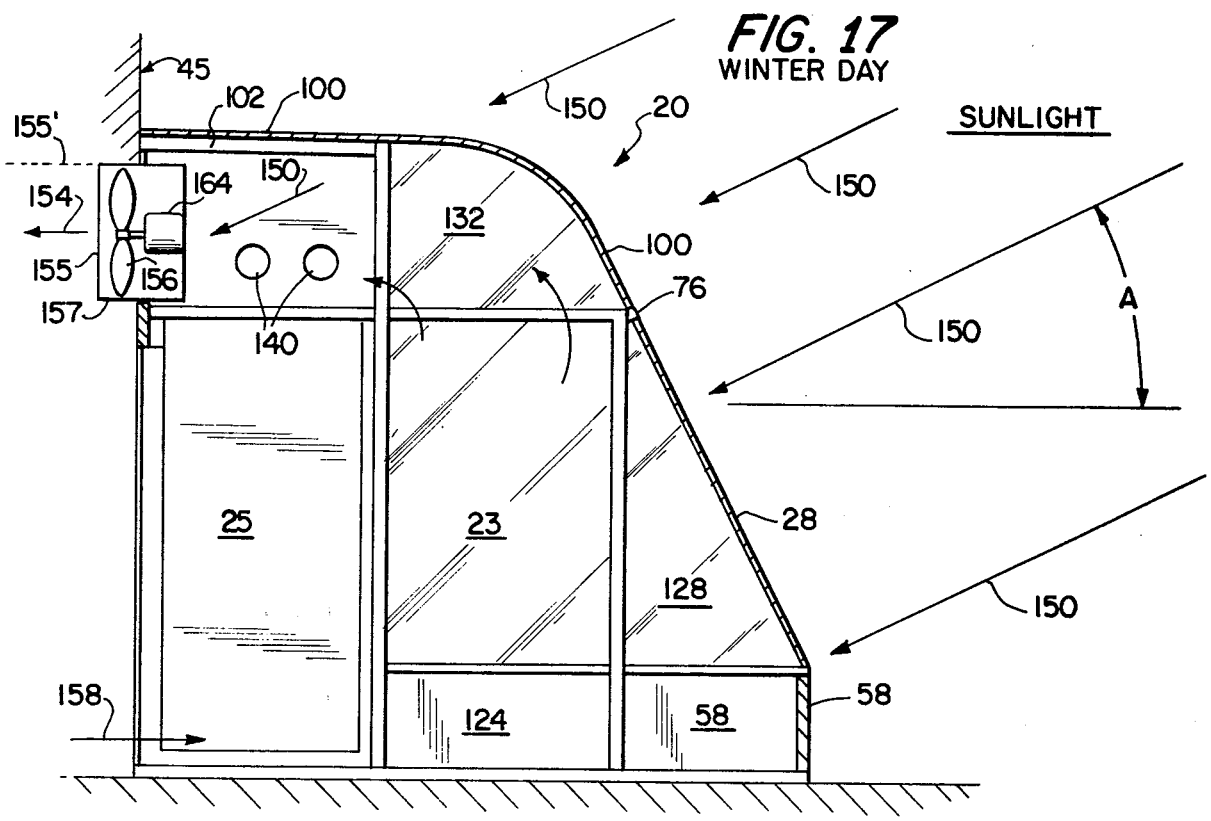
FIG. 17 WINTER DAY
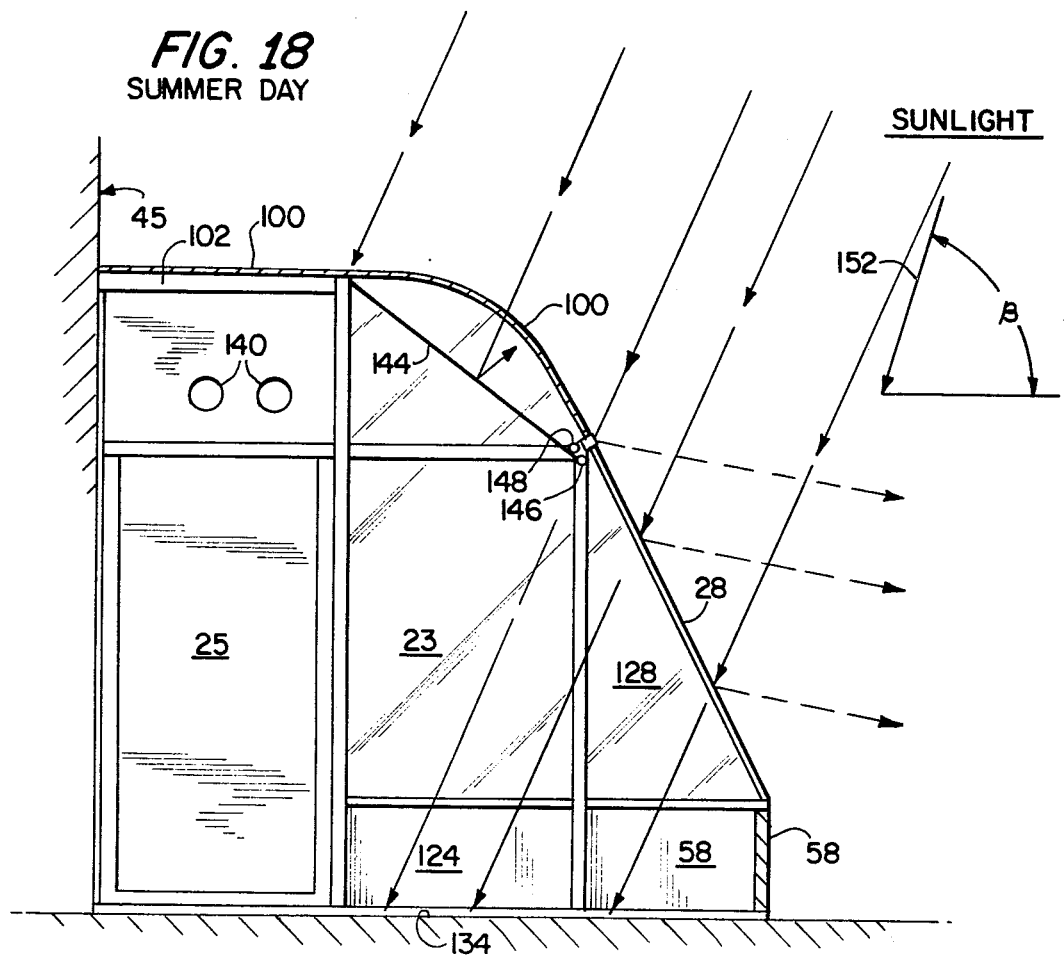
FIG. 18 SUMMER DAY

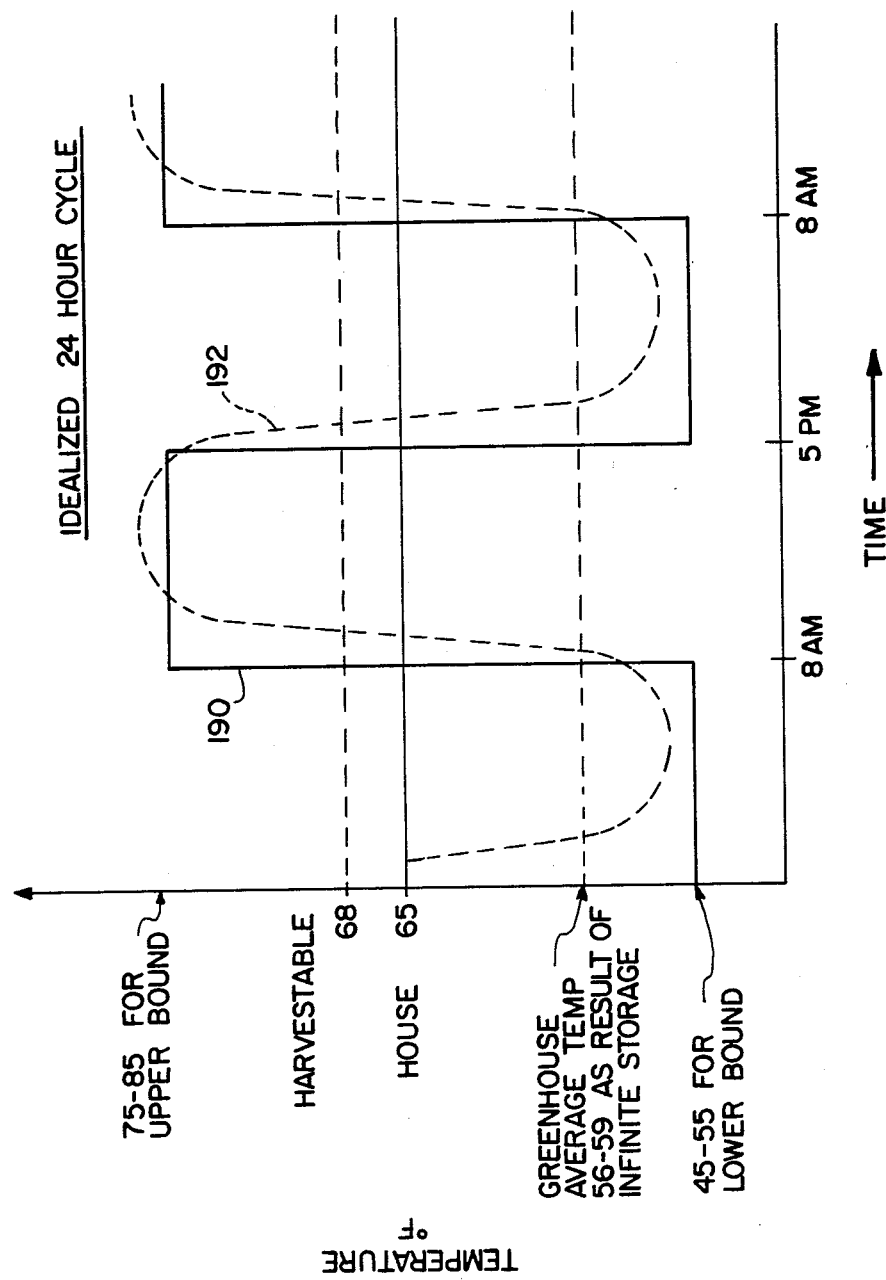

MODULAR SOLAR GREENHOUSE WITH ELEVATED OVERHEAD HEAT STORAGE MATERIAL AND MOVABLE INSULATION BARRIERS AND METHOD AND SYSTEM FOR SOLAR HEATING OF ATTACHED LIVING SPACE USING THERMOSTAT-CONTROLLED AIR CIRCULATION FOR HARVESTING HEAT

FIELD OF THE INVENTION

The present invention relates to optimizing collection, retention and utilization of solar energy with at least one overhead horizontal unit of room-temperature thermal storage material and relates to a solar greenhouse heating method and system, and more particularly to such a method and system utilizing elevated overhead horizontally disposed units of heat storage material with thermostat-controlled air circulation from the solar greenhouse region into the living space to be heated. Thus, this invention lies primarily in the field of passive solar heating, but it also includes thermostat-controlled forced air circulation and, therefore, it provides aspects and important advantages of a hybrid system.

BACKGROUND INFORMATION AND ADVANTAGES OF THE INVENTION

The field of solar heating can be divided generally into two types of systems: (1) active, and (2) passive.

In an active system, there is a solar energy collector which may include radiation focusing, directing or concentrating means plus a heat transfer fluid which is pumped through the collector, a circuit for conducting the heat transfer fluid (usually a liquid), a pump, pump control means, plus a heat exchanger through which the heat transfer fluid is pumped after it has been heated by the solar collector. From this heat exchanger, the heat energy is made available for heating the desired living space. Other elements, such as heat storage units, may be included in an active system.

Such active systems suffer the disadvantages that they are relatively sophisticated or complex and expensive. Active systems are also critical in their operation, particularly when the heat transfer fluid is a liquid, since leakage or non-circulation of the liquid on a hot mid-summer day can result in overheating of the collector leading to its damage or destruction. Other critical factors result from the fact that the solar collector plus its radiation focusing, directing or concentrating means, must be installed in an exposed location where they are subject to the attrition of weather and battering of storms. Such exposed solar collectors suffer the added disadvantage that they rapidly lose heat in the winter and become cold whenever the sky is overcast during the hours from dusk to dawn, when incident solar radiation does not occur.

Moreover, many active systems require a relatively high temperature to be attained in the solar collector itself before the system can raise the heat transfer liquid up to the desired relatively high temperature, as required by the heat exchanger. Such relatively high temperature requirements in the collector, lead to the result that very little useful solar heat energy can be collected on partially overcast or intermittently cloudy days and cause rapid heat loss at night.

The present invention does not lie in the field of active solar heating systems, which are non-analogous in many aspects of this invention.

In a passive system, the building structure itself, in which is enclosed the living space, is arranged to receive and to retain much of the heat energy from the incident solar radiation during winter months. This structure is also arranged to reject, reflect and dissipate much of the heat energy from the incident solar radiation during summer months when the sun is higher in the sky and remains above the horizon for more hours during the day, for preventing overheating of the living space. Advantageously, passive systems have few moving parts, and the exterior surfaces of the building structure itself are those elements which are exposed to the weather. In other words, exterior collector elements are not employed, and the exterior surfaces of the building structure itself tend to have much greater durability against weathering and storm damage than exposed collector elements.

Furthermore, passive systems have the great advantage that they are inherently relatively low temperature systems. The temperature levels to be attained from incident solar radiation need only be a few degrees above the temperature level desired to be provided in the living space itself, for example 68° F. Therefore, passive solar systems can capture much useful solar energy on partially overcast or intermittently cloudy days and can even capture a significant amount of useful heat from diffuse sky radiation on moderately overcast winter days even when the ambient temperature is low. Under such conditions, active solar heating systems are essentially ineffective.

The direct components of a passive solar heating system are (1) an aperture facing within 45° of the true south, constructed in such a manner that its surface when glazed will be at an angle approximately perpendicular to the sun's rays at winter solstice; (2) a glazing covering said aperture which maximizes the transmission of solar radiation while minimizing through its construction or by insulative additions the outward flow of heat via radiation, convection and conduction; and (3) storage means which absorbs solar radiation and re-releases this thermal energy at times of need to maintain appropriate interior space temperatures. Additional components which may be added to passive systems are fans which provide for thermo-circulation from the solar heated space to adjacent or connected spaces requiring heat.

This invention lies in the field of passive solar heating systems employing solar greenhouses. The presently preferred embodiments of the method and system of this invention, as described in this specification, include relatively few moving parts. A single fan is utilized and controlled by a differential thermostat. During winter operation, the rate of energy flow (thermal flux) from the greenhouse to the attached structure to be heated, is controlled by the fan which, in turn, is controlled by the thermal differential between the greenhouse and attached structure. Advantageously, the air is drawn by this fan over the units of thermal storage material as the air is being circulated into the attached structure. In the summer, the fan is reversed to provide for expelling heated air from the attached structure and from the greenhouse for preventing overheating. Depending on harshness of climate, two removable thermal barriers may be utilized which are open during the daytime for admitting solar radiation and are closed at nighttime for enclosing the interior of the solar greenhouse to prevent undue heat loss at night. One of these removable barriers covers the upper portion of the interior of the greenhouse and the other covers the side or sides of this region.

In view of the fact that air is circulated, this passive solar heating method and system of the present invention may be considered hybrid in nature, but in its major thrust this invention provides all of the advantages of a passive system plus many others as will be described later on.

A detailed paper, "Design Considerations, Theoretical Predictions, and Performance of an Attached Solar Greenhouse Used to Heat a Building", published in the Proceedings of the June 6–10, 1977 Annual Meeting of the American Section of the International Solar Energy Society by two of the current inventors (Taff and Holdridge) outlines early work on the hybrid greenhouse systems which preceded the current invention. In addition, in an earlier paper entitled "Solar Sustenance Project" by William F. Yanda (also one of the current inventors), published by the International Solar Energy Society in the Proceedings of the July 28–Aug. 1, 1975 International Solar Energy Congress and Exposition, the author clearly laid out the groundwork for the symbiotic thermal relationship between an attached solar greenhouse used as a passive solar heater and its benefits to an attached dwelling. These two papers reflect early work of the inventors and set the foundation for their current invention.

A recent book which describes the current state of the art in solar greenhouses is *The Food and Heat Producing Solar Greenhouse* (Revised and Expanded Sixth Printing) by Bill Yanda and Rick Fisher, available from John Muir Publications, Inc., P.O. Box 613, Santa Fe, N.Mex. 87501. This publication describes certain principles and thermal characteristics of solar greenhouses, including the effects of added mass within the greenhouse, such as barrels of water against the north wall (FIGS. 7,9 and 214), or water in a sunken fish tank (FIG. 167) for absorbing and storing heat, or water in barrels over the entrance (FIG. 180), or in storage tubes and containers (FIG. 197), and the effect of heat storage mass in heat storage walls or in rock beds (FIGS. 105, 110, 129, 142 and 152). This book describes the basic "greenhouse effect" (FIG. 5) and illustrates various possible geometrics for solar greenhouses and describes the effects of placement or orientation of such structures relative to the sun's rays at various times, at various latitudes. Also described are the use of movable insulation (FIGS. 37–45, inclusive), roll-up insulating curtain walls (FIGS. 191, 192, 193) and a pivoted insulator reflector curtain (FIG. 158). The final Chapter VIII reviews "The State of The Art" including reference to attached solar greenhouses. Appendix E describes "Heat Distribution in the Attached Greenhouse on a Clear Winter Day".

In the Arizona Highways issue for May, 1980 is an article entitled "Solar Energy—Where It Is and Where It's Going", plus other articles about utilization of solar energy. The main focus of the home heating discussions is on active solar heating systems, but there is some discussion of passive systems.

The technical publication *SOLAR ROOM*, written by two of the present inventors, and published by Garden Way Publishing of Charlotte, Vt., in 1976, describes attached solar greenhouses and free-standing solar greenhouses.

A publication *Advance ZeroThermic Greenhouses* shows a pre-engineered modular greenhouse using urethane insulation and connected to a home by air ducts.

The prior art solar greenhouse structures described, plus the other information in these publications provide certain advantages, but they do not anticipate nor render obvious the present invention.

In spite of all of their numerous advantages, as indicated from the above comparison between passive and active systems, our recent analyses have revealed four significant problem areas causing serious shortcomings in performance of prior art solar greenhouses. These problem areas are (1) heat storage, (2) unduly large heat loss through the glazing, (3) excessive east/west glazing, and (4) inefficient overall geometric configuration including inadequate south facing aperture.

If insufficient thermal storage mass is provided in prior art structures, then late, during cold winter nights and during the subsequent early morning hours, the stored heat energy is all consumed, allowing temperatures in the space to drop relatively freely to unattractively low levels during these late night and early morning periods of time.

On the other hand, if excess thermal mass not having latent heat properties is provided, such excess produces a resultant temperature level in the greenhouse wherein the daily fluctuations are minimized, but unfortunately such a temperature level is usually too low to provide any useful heat to the attached structure. Thus, the result is an optimized growth environment for plants in the greenhouse itself, but the greenhouse no longer serves as a useful producer of heat for the attached structure.

An important principle determining the solar heating capacity of the attached greenhouse is to keep nighttime temperatures therein no lower than a predetermined threshold, which we calculate to be 42° F., while maximizing those periods when the greenhouse interior is at a temperature sufficient to provide useful heat for delivery to the attached structure, which we calculate to be at least 68° F. but no greater than approximately 80° F., and also while maximizing those periods when thermal energy is being stored by direct absorbtion into a latent heat material active in this range.

The objective of the present invention is to "harvest" economically significant amounts of solar energy for heating a building; thus, maximizing "harvestability" of solar radiation generated heat from a solar greenhouse is an important objective.

This above-stated predetermined threshold or lower bound (calculated to be 42° F.) is selected to allow viable plant growth while minimizing the need for auxiliary heating of the interior of the greenhouse.

The above-stated upper boundary range (calculated to be 68° F. to 80° F.) is selected to be adequate for producing desired heating of the attached structure while at the same time minimizing heat loss through external panels and glazing of the greenhouse. (It is to be understood that as the temperature in the interior of the greenhouse increases, the differential $\Delta F.°$ between interior and exterior temperatures directly increases, and the heat loss to the exterior approximately linearly increases with increase in $\Delta F.°$.)

Movable insulation in many prior art solar greenhouses is often in relatively heavy panel form and in many cases is required to be installed in high or narrow locations in which the insulation is awkward to handle, thereby calling for considerable labor in set up and removal. Thus, the average homeowner may tend, from time-to-time, to avoid or postpone the deployment of such insulation. This failure to set up in early evening during winter causes rapid loss of stored heat energy and upsets the operation of the passive system, resulting in erratic temperature drops in the living space. If there are plants and vegetables growing in the greenhouse, they can be quickly damaged or killed by such rapidly falling temperatures.

SUMMARY OF ADVANTAGES OF THE ILLUSTRATIVE EMBODIMENTS OF THE INVENTION

Among the many advantages of the present invention are those resulting from the fact that it overcomes the above problem areas of heat storage, movable thermal insulation, and glazing quantity and geometry in a method and system providing cooperative interaction of the solutions to these four problems which is synergistic in effect as will be explained further below in maximizing harvestability of economically significant quantities of heat from a solar greenhouse for heating an attached building.

Advantages of the presently preferred embodiments of the invention, as described, are that they are modular solar greenhouse structures which can be assembled in various lengths for installation as a retrofit unit adjacent to a south wall of an existing home, or other building, containing living space; or can be included in new construction; or can be assembled with site fabricated north wall as self-sustaining units.

The embodiments described are primarily designed to be installed on the south side of a residence or commercial building and when so installed are capable of sustaining a uniform snow load of fifty pounds per square foot and a superimposed load of 20 pounds per sq. ft. from hanging loads of plants and thermal storage units and a wind load of 30 pounds per sq. ft. Therefore, this structure meets the requirements of the National Building Code and of the Uniform Building Code for the vast majority of the area of the continental United States. Further, this greenhouse is at least double-glazed, which will meet these Codes in all areas of the U.S.A. where home heating is required (except where 70 lbs. per sq. ft. of snow loading is encountered).

This solar greenhouse structure allows the south wall of the home to be opened with large doorways and picture window, if desired, adjacent to the north side of the solar greenhouse for providing a very attractive sunporch contiguous with the living space in the home.

The illustrative modular solar greenhouse structures will span any east/west distance in increments approximately four feet and a ten foot or a six foot-eight inch distance in the north/south direction without an internal post.

There are east/west end wall modules serving to enclose the respective east and west sides of the solar greenhouse. Between the east and west side modules are a plurality of identical intermediate modules each of which is approximately 4 feet wide in an east/west direction, and 10' or 6'8" wide north/south. By employing the two side modules plus two or more of the intermediate modules, the assembler can quickly and conveniently erect various sizes of solar greenhouses measuring 10' by approximately 8', 12', 16', 20', etc. or 6'8" by approximately 8', 12', 16, 20', etc. as may be desired.

The modular components are light, readily packageable, and there are relatively few different components in the overall greenhouse structure.

The upper portions of the rigid curving extruded aluminum frames are at an elevation which is well above the head height of a tall adult and are sufficiently strong that baskets and bowls containing plants can be hung from them.

Suspended beneath these frames by neat stainless steel cables and elevated above head height are a multiplicity of clear containers of phase change heat storage material. For example, these container units are shown as elongated, moderate diameter, parallel horizontal transparent rigid plastic tubes containing the latent heat (phase change) material, for example each 7'9" long.

In the preferred embodiments of the invention, as discussed, this heat storage material is a phase change material having a melting/solidifying narrow temperature range closely approximating the average temperature level desired to be maintained in the living space in the attached structure during daylight hours. Advantageously, this particular heat storage material is translucent in its solid state and is transparent in its liquid state for allowing incident solar radiation to pass through the melted material.

There is an opaque insulated roof included in the embodiments of this invention having the 10' north/south extent. By virtue of the fact that this roof is spaced above the heat storage units, there is a vertical spacing between the opaque roof and the heat storage units which enables the solar radiation to be incident upon them during mid-winter days when the sun's arc of travel is low in the sky, but which automatically blocks the sun's radiation from increasing portions of these units when the sun's arc of travel is at successively higher elevations in the sky during progressive Spring changes, and vice versa during progressive Fall changes in the sun's travel. Thus, the geometric arrangement of these elevated horizontal heat storage units with respect to the opaque insulated roof automatically compensates for the decreasing and increasing amounts of incident solar energy occurring during the seasonal changes before and after mid-winter.

A movable, reflective insulating barrier curtain is conveniently pulled into its extended (closed) position for retaining heat in the solar greenhouse. In the summer, during daytime, this insulation barrier curtain can be placed in its extended or closed position for keeping the sun's energy away from the heat storage units for preventing overheating storage of unduly large amounts of heat energy during summer.

Other advantages of the elevated heat storage material in the form of solid/liquid phase change material is that a more favorable photosynthesis and heat distribution environment for growing plants and vegetables is provided. In the morning, the sun's rays are entering at a low angle. They strike the units of this material, which is now mostly or entirely solid as a result of loss of stored heat energy during the preceding nighttime. This solid storage material is translucent, having a milky white appearance when seen from the opposite side (and also when seen from the same side) relative to the side on which the sun's rays are impinging. Consequently, the low angle sun's rays during winter mornings are both diffused and reflected by the multiple units of translucent milky white storage material in the elevated units to provide an overhead source of illumination for promoting growth in essentially all leaves in the plants and vegetables in the greenhouse. In other words, shadows are minimized, and the overhead location of the distributed milky white illumination encourages vertical growth, i.e. abnormally phototropic growth effects are minimized.

As the sun moves up along its arc during the day, progressively more of the storage material stores sufficient heat energy to change from a translucent solid to a transparent liquid, and consequently the incident solar radiation can travel through these transparent regions to strike against the north wall to become reflected diagonally downwardly off of the north wall toward the growing vegetation. This reflected radiation coming diagonally down from the north balances against the diagonal direct solar radiation from the south for continuing to promote generally vertical balanced growth.

Increasing amounts of the phase change heat storage material become transparent as more and more solar energy is stored, thereby continuing to balance the north wall reflected radiation with the direct solar radiation during the mid and later portions of the day. Those regions of the storage material which remain translucent all day advantageously continue to produce a desirable diffuse widespread overhead illumination for avoiding shadowing.

In the nighttime, insulation barrier curtains are extended above the height of the elevated horizontal thermal storage units and diagonally near the glass of the solar greenhouse. Thus, this elevated thermal storage material acts like a "warm sky" at nighttime gently radiating room-temperature heat downwardly upon the vegetation for keeping it generally uniformly warm and healthy even though temperatures drastically drop outside during the cold, long, mid-winter night.

By virtue of the fact that the heat storage units are horizontal and elevated with an extendible insulation curtain positioned and held above their level, they can be completely blocked from the sun's rays in the summertime while allowing sunlight to enter the greenhouse and flood the floor area with pleasing summer light. This coupling between the elevated horizontal heat storage units and the extendible curtain is synergistic in effect because it enables a greater or lesser amount of the heat storage material to be removed from participating in the passive solar heating environment, and yet this "removed" material remains in exactly the same physical location as before. A phantom removal, but a very realistic and effective one, is provided. In addition, the sun's rays are allowed to flood in upon the floor area in plentiful amount even when all of the heat storage material is being removed from direct impingement of the sun's rays by a fully extended reflective insulation barrier.

The deployed movable reflective insulation curtain may be arranged to be pulled down in the nature of a window shade parallel to the glass, unwound from an overhead roll. It achieves a combined R factor with double glazing of 5.3 ±0.5. Thus, "U", which equals $1/R$, $=0.19$.

Further advantages of this solid/liquid phase change result from the fact that its change of state from solid to liquid occurs in a narrow temperature range closely corresponding to the desired room temperature. Thus, there is a close coupling between the air temperature in the living space and this heat storage material for stabilizing and closely regulating the living space temperature. Furthermore, thermostat-controlled air flow is drawn across the multiple heat storage units for enhancing the close coupling between the thermal storage material and the room temperature in the living space. This forced air circulation under differential thermostat control also augments the amount of heat energy which can be stored in the storage units as compared with their storage action without such forced air circulation.

The preferred thermal storage material as described and claimed in said copending application is an organic polymer which does not exhibit corrosive effects, nor stratification, nor segregation, such effects as occur with conventional water soluble salts that have been proposed by others for thermal storage. Our specific preferred organic polymer is known as polyethylene glycol 600 having a capability of storing approximately 63 Btu's per pound during change of state from solid to liquid preferably within a temperature range of 68°-77° F. (the melting/freezing temperature) which advantageously corresponds closely with the desired room temperature. The polyethylene glycol exhibits only a small change in volume during its change of state, so that only a relatively small amount of trapped air in each thermal storage unit of the array provides resilience to accommodate the expansion/contraction of this material for preventing rupture of the transparent plastic containers in which it is held.

BRIEF DESCRIPTION OF THE DRAWINGS

The various features, aspects, objects and advantages of the present invention will become more fully understood and appreciated from a consideration of the following detailed description of presently preferred embodiments of this invention. These illustrative embodiments are the best mode now known to us for putting the invention into practice.

In the drawings:

FIG. 1 is a perspective view of a prior solar greenhouse.

FIG. 2 is a perspective view of another prior solar greenhouse.

FIG. 3 is a perspective view of a modular solar greenhouse structure embodying the invention attached to the south side of a home or other building containing living space for providing solar heating of such living space; portions are shown cut away for clarity of illustration. This solar greenhouse has a nominal E-W length of twenty feet; it contains five intermediate modular sections.

FIG. 4 is a perspective view of the interior of a similar solar greenhouse attached to a home with the west end portion shown cut away in sectinal view. Thermal curtain insulation is shown deployed in the eastern module of the solar greenhouse, which has a nominal E-W length of sixteen feet.

FIG. 6 is front or southern elevational view of a nominally sixteen foot long solar greenhouse, i.e. with four intermediate modular sections, embodying the invention.

FIG. 7 is an exploded perspective view showing the structural elements and glazing elements of a nominal twenty foot long solar greenhouse embodying this invention.

FIG. 8 is a cross section, shown enlarged, of one of the intermediate mullions or frames and the margins of the adjacent double glass glazing supported by this mullion. FIG. 8 is a cross section taken on the line 8—8 in FIGS. 4, 5 and 6.

FIG. 11 is a cross-sectional view of a base sill channel member which is advantageously thermally broken.

FIG. 11A is a cross-sectional view of the glazing wedge strip in its relaxed extruded shape.

FIG. 12 is an enlarged elevational sectional view of the knee region of the greenhouse frame, being a section taken along line 12—12 in FIGS. 3, 4 or 5.

FIG. 13 is a plan sectional view of a vertical glazing bar in the end wall, being a section taken along line 13—13 in FIG. 7.

FIG. 14 is a cross section of a snap-in clip, trim strip.

FIG. 15 is a plan sectional view of the gable (corner) frame member and adjacent components, being a section along line 15—15 in FIG. 3.

FIG. 16 is an outline of the end elevational view of another embodiment of this invention.

FIGS. 17 and 18 show relationships to the sun's rays in winter and summer, respectively.

FIG. 19 is used to explain the concept of harvestable (useful) solar energy resulting from desirable temperature excursions within the solar greenhouse.

DETAILED DESCRIPTION

In FIGS. 3-6 are illustrated two presently preferred embodiments of the invention which will be specifically described as non-limiting examples of our invention. In the first embodiment (E1), the thermal insulation curtains are omitted. In the second embodiment (E2), the thermal curtains are included.

Figure 5:
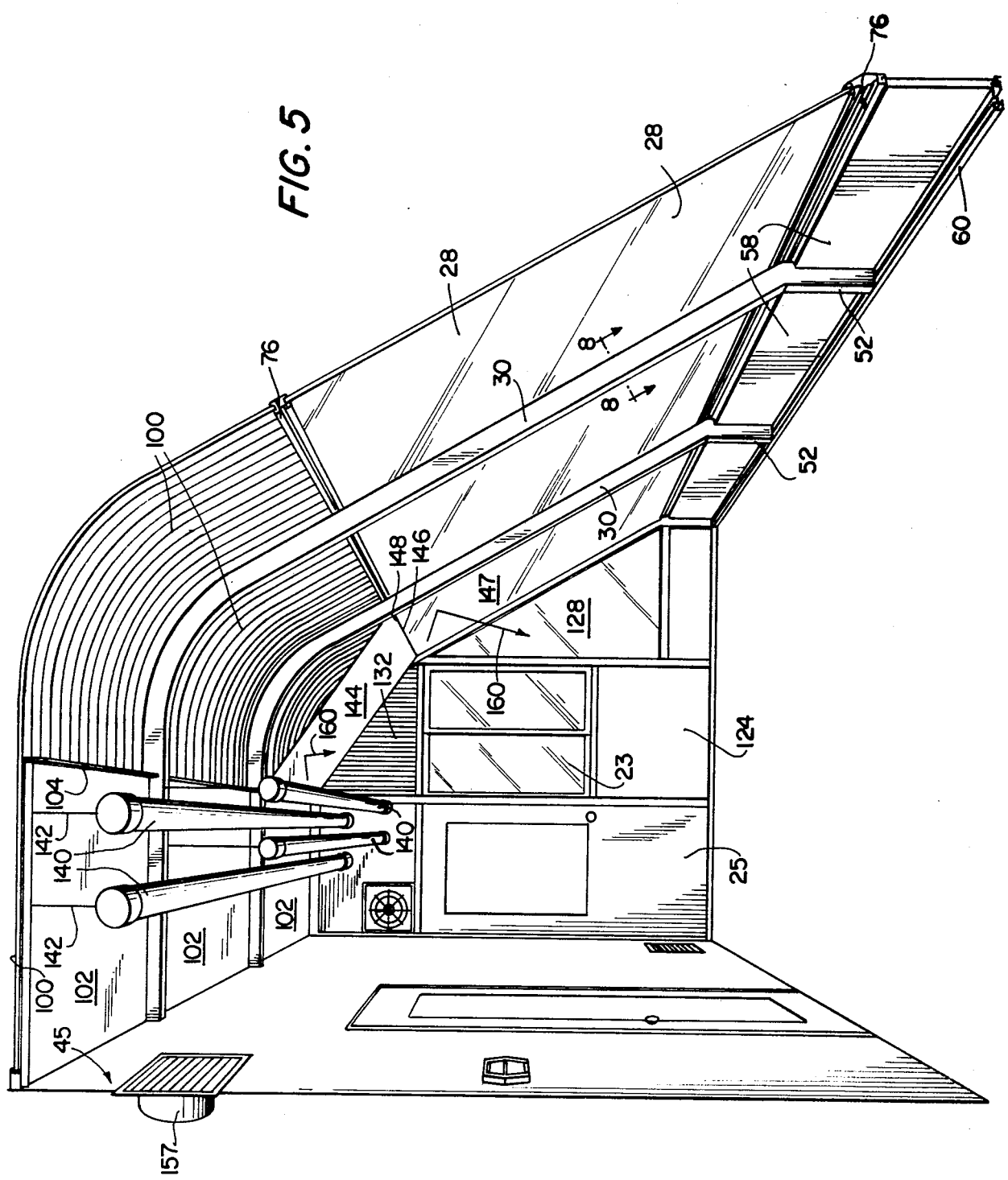
FIG. 5 is a perspective view of the interior of a solar greenhouse similar to that in FIG. 3 with the curved eave glazing being formed by specially curved panels of double-skinned acrylic sheet. This solar greenhouse has a nominal E-W length of twelve feet.

As seen in FIG. 3, the solar greenhouse 20 spans approximately twenty feet in the east-west direction, as indicated by the arrow E-W, and a ten foot distance in the north-south direction, as shown by the arrow N-S, without an internal post. If more than five intermediate modules are employed, a longer E-W solar greenhouse structure can readily be assembled in modular fashion as will become more fully understood from this description, and conversely a shorter E-W solar greenhouse is formed with fewer than the five intermediate modules shown in FIG. 3, for example, as shown in FIGS. 4, 5 and 6.

It is not critical nor necessary that this solar greenhouse be oriented facing directly south as shown, because it can be oriented toward the SSE or toward the SSW without unduly diminishing its performance. However, optimum performance is achieved with a true south orientation, as shown in FIG. 3. For convenience of description and for convenience of the reader's understanding, this novel solar greenhouse will be described as being oriented true south, but in actual practice, this embodiment of the invention is not limited to a true south orientation.

The solar greenhouse 20 includes an east side module 22 (FIG. 4) including a window 23 and a door 25, if desired, and a west side module 24 (FIG. 3) including a door 25 and a window 23, if desired. Each of these side wall panels 22 and 24 is vertical and is only a few inches thick as measured in an east-west direction, and ten feet wide in a north-south direction. These two side modules serve to enclose the respective east and west sides of the solar greenhouse. Between them are a plurality of identical intermediate modular sections 26 each of which is 46½" on-centers long in an east-west direction and ten feet wide north-south. The east and west end modules are each 2½" thick. By employing the two end modules, plus three or four of the intermediate sections, the assembler can quickly and conveniently erect two different sizes of solar greenhouses measuring 10'×12'½" or 10'×15'11", as may be desired. Longer or shorter solar greenhouses can be assembled quickly and conveniently by employing an assemblage including more or less of the intermediate modular sections 26.

There are downwardly and outwardly (southerly) sloping window panels or glazing areas 28 in the south face of the intermediate modular sections 26. These glazing areas 28 are of transparent thermally insulating multiple layered glazing material, for example of spaced parallel double (or triple or heat-mirrored double) glass glazing with intervening sealed dry air or inert gas space, such as are commercially available today in the United States under the trademark "Thermopane" or "Superglass". The sloping edges of these glazing panels 28 are supported by sloping front mullions or frames 30 of rectangular tubular extruded aluminum, as shown in cross section in FIG. 8.

The marginal portions of the two adjacent window panels 28 are held by an extruded aluminum glazing cap 29 (FIG. 8) removably secured to the mullion 30 by machine screws 31 engaged in screw track grooves or channels 32 extruded in the outer face of its rectangular section. There is a similar screw track groove 34 formed in the inner face of the mullion 30. This inner screw track 34 is used for mounting plant hangers and accessories within the solar greenhouse. In FIG. 8 the screw track 34 and screws 35 are holding a decorative and protective strip 36, for example, of stiffly flexible durable plastic having upturned projecting edges forming neat small gutters 38 for catching and disposing of any condensed moisture which may collect on the mullion 30.

The glazing cap 29 (FIG. 8) has a width equal to the width of the mullion 30 and has two parallel dovetail grooves 39 each holding a resilient glazing pad 40 of EPDM synthetic material, such as ethylene-propylene-diene-monomer material being commercially available and being highly durable and resistant to weathering. In opposed relation to these outer glazing pads 40 are a pair of identical inner glazing pads 42 held in similar dovetail grooves 41 in the outer surface of the mullion 30. In order to cover the heads of the machine screws 31, there is a cosmetic cover strip 44 of durable stiffly flexible plastic with out-turned flanged edges which snap snugly into a pair of opposed narrow parallel grooves extending along the glazing cap 29 on either side of the heads of the machine screws 31.

It is to be noted that there is a thermal isolation between the glazing cap 29 and the mullion 30, the only metal-to-metal thermal conduction path between them is through the spaced screws 31.

Figure 9:
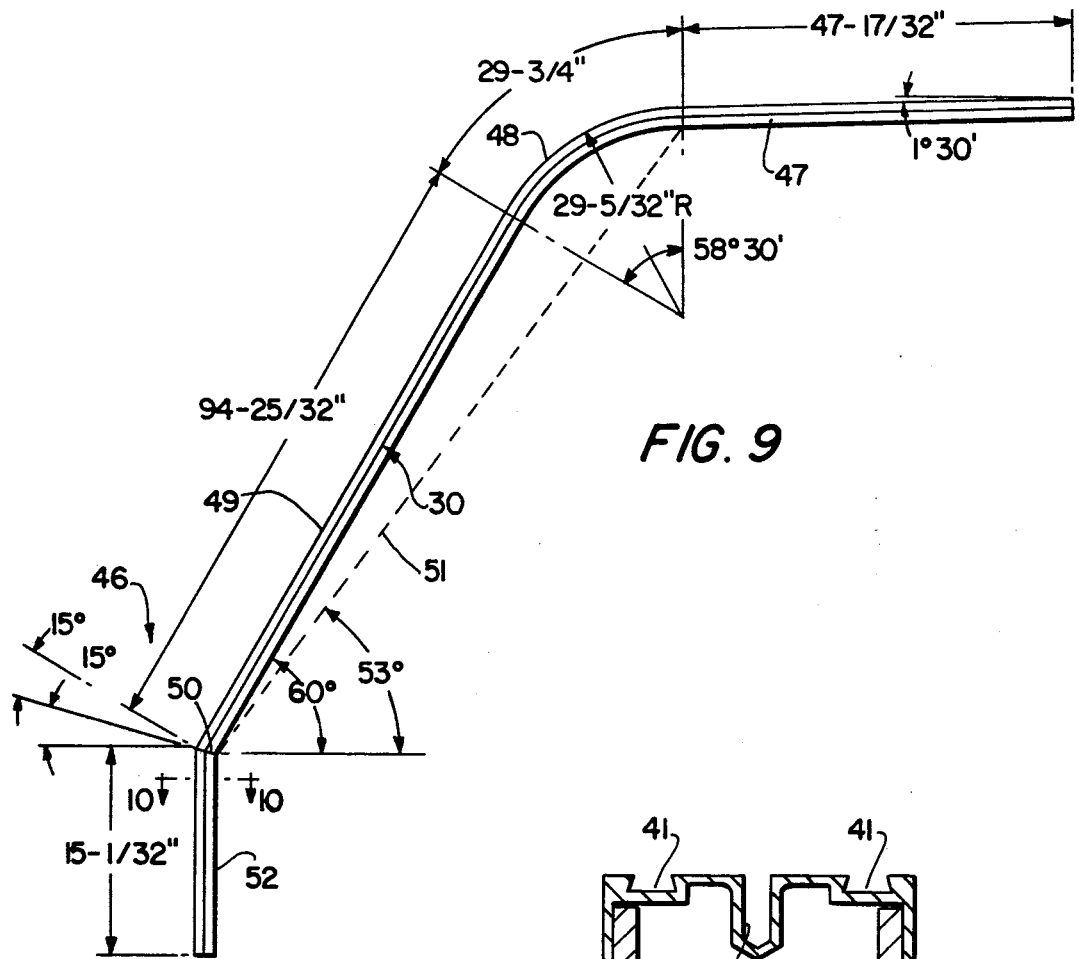
FIG. 9 is a side elevational view of one of the rigid frame members having a curved shoulder and shows its dimensions and angles.

As seen most clearly in FIGS. 7 and 9, the mullions or frames 30 are rigid integral members each extending from the upper end which is effectively anchored to the attached building 45 (FIGS. 3, 4 and 5) down to a knee region 46 (FIGS. 4, 7 and 9). The dimensions and angles of one of these mullion frames 30 are shown in FIG. 9. Such a frame 30 includes a top straight portion 47 inclined downwardly to the horizontal at 1° 30' for shedding rain away from the attached building. The frame 30 includes a rounded shoulder 48 having a radius of curvature slightly less than 30" and a straight southerly sloping front portion 49 terminating at a 15° mitre-cut lower end 50 at the knee region 46. The southerly sloping straight front portion 49 is at an angle of 60° to the horizontal.

As will be seen from FIGS. 3, 4, 5 and 6, the south facing glazing area or south facing aperture for receiving solar radiation extends from the knee region 46 up to the location where the rounded shoulder 48 (FIG. 9) joins the gently sloping top portion 47 of the mullion frame 30. Therefore, as shown by the dashed line 51 (FIG. 9), the effective slope of this south facing glazing is at an angle of approximately 53° to the horizontal.

Figure 10:
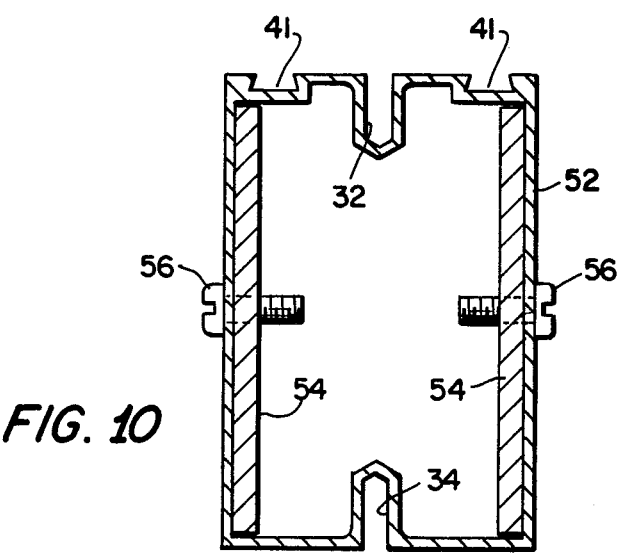
FIG. 10 is a cross-sectional view taken on line 10—10 in FIGS. 7 and 9 showing how the frame member is spliced to a lower vertical strut by internal plates.

Below the knee region 46, there are vertical struts or studs 52 whose upper ends are mitre-cut at 15° (FIG. 9) to about flush against the correspondingly mitred lower ends 50 of the mullion frames 30. These struts 52 are of extruded aluminum and have the same hollow rectangular cross-sectional shape (FIG. 10) as the mullion frames 30 (FIG. 8). In order to splice the vertical strut member 52 to the lower end 50 of the mullion frame member 30 there are a pair of dog-leg shaped aluminum splice plates 54 (FIG. 7) which snugly fit into the rectangular interiors of these members 52 and 30 and are firmly secured by multiple self-tapping screws 56 (FIG. 10) to the inner surfaces of their walls.

These studs or struts 52 hold opaque, insulated knee wall panels 58 (FIGS. 3–6) by means of glazing pads (not shown) fitting into dovetail grooves 41 (FIG. 10) and by means of glazing caps 29 (FIG. 7) similar to the holding arrangement shown in FIG. 8. The knee wall panels 58 and all other opaque, thermally insulated panels are composed of two ⅛" thick oil-tempered hardboard sheets 57 (FIG. 11) sandwiching between them a core 59 of foam insulation at least 1" thick, e.g. a core of very high density closed cell foamed polyurethane having an R factor of 9¼ per inch. The surfaces of these hardboard sheets 57 are finished by laminating with decorative vinyl wallcovering or painting or other desired surface treatment. The exterior is preferably aluminum sheet faced. In order to have the same edge thickness, namely ⅝", as the glass panels 28, the edges of the knee panels are rabbeted on the inside, so as to fit between the glazing cap 29 (FIG. 7) and the strut 52.

The lower ends of the struts 52 are secured to an extruded aluminum base sill channel 60 (FIG. 11) which, in turn, has its lower flange fastened by lag screws 61, as shown dotted at 61' to a site-prepared wooden sill member 62 (FIG. 4) seated onto a foundation wall 64 with an appropriate footing (not shown) located down in the earth below the level of frost penetration. This base sill 60 has a screw track groove 32 in its top web 66 which is used to attach the struts 52. A pair of right angle brackets are used to make the attachment by screwing the bracket legs to the base sill 60 and the other bracket legs to the opposite sides of the strut 52 in straddling relationship.

The top web 66 (FIG. 11) has a downwardly extending outer flange 67 which is connected by a strong rigid plastic bridge 69 to an opposed flange 68 defining a socket between them for receiving the rabbeted lower edge of the knee wall panel 58. Initially this base sill 60 is extruded as an integral member including the flange 68 and having a pair of opposed C-shaped rigid plastic anchoring channels 70 facing each other. Then these channels 70 and the space between them is filled with the bonding plastic 69. Finally, the portion of aluminum extrusion which originally connected the thermally isolated outermost flange 68 to the remainder of base sill 60 is machined away, thereby advantageously creating a novel thermally broken aluminum and plastic member. The lower edge of the opaque insulated wall panel 58 rests on an EPDM resilient setting block 72 in the socket between the flanges 67 and 68 and is held by an EPDM glazing wedge strip 74 engaged on the inturned lip 75 of the flange 68. This glazing wedge strip 74 is initially extruded with a concave inner surface, as shown in FIG. 11A. Thus, it exerts a firm spring-like pressure against the held panel 58 when the glazing wedge 74 is forced in place under the socket lip 75.

In order to hold the rabbeted top edge (FIG. 12) of the knee wall panels 58 there is a horizontally extending thermally broken H-shaped muntin 76 secured to the struts 52.

The muntin 76 includes a thermal isolation (thermal break) bridge 69 of strong rigid plastic bonded into the opposed C-shaped anchoring channels 70. This muntin 76 (FIG. 12) includes a nut track channel 77 and defines upper and lower sockets 78 and 79 each located between an inner flange 80 having a hook-shaped lip 81 and an outer flange 82 having an inturned lip 75. The top edge of the knee wall panel 58 is held in the lower socket 79 of the muntin 76 by a glazing wedge 74 engaged on the inturned lip 75 and by an EPDM glazing insert 83 engaged on the hook-shaped lip 81. An extruded aluminum angle strip 84 attractively covers the rabbet in the opaque insulating knee wall panel 58.

As shown in FIG. 7 in order to splice the horizontal muntin 76 to the end of a similar muntin for installing a solar greenhouse having a longer E-W length, a pre-drilled and screw-thread-tapped splice bar 86 of rectangular cross section is inserted into the nut-track channels 77 (FIG. 12) of the abutting muntins and secured in place by machine screws.

In order to hold the lower edge of the glass panel 28 (FIG. 12), there is an extruded aluminum knee-shaped member 87 (see also FIG. 7) called an eve cap or knee cap with inner and outer lower flanges 88 and 89. These flanges 88 and 89 have exterior grooves 90 and 91 advantageously conforming with and mating with the hook lip 81 and the opposed inturned lip 75, respectively, in a snap-in connection. This knee cap member 75 is thermally broken, with a strong rigid plastic bridge 69 bonded into opposed C-shaped anchoring channels 70. It is to be noted that the thermal isolation bridges 69 in the various members, as described, are formed of commercially available "Baydur 600". The knee cap member 87 (FIG. 12) includes a nut track channel 77 and is spliced to an abutting horizontal knee cap member 87 (FIG. 7) by a splice bar 86 secured in the nut channels 77 in the same manner as for splicing the muntins 76 (FIG. 7).

The lower margin of the glass glazing 28 rests on a resilient EPDM setting block 72 in a socket 92 extending along the top edge of the knee cap member 87, defined between its inner and outer upper flanges 94 and 95. A glazing wedge 74 engages the inturned lip of the outer flange 95 and a glazing pad 96 is placed on the inner flange 94 adjacent to the glazing 28.

The knee cap member 87 is secured to mullion frame 30 by right angle brackets 98 (FIG. 12) bolted to the nut channel 77 and secured to the mullion by self-tapping screws 99. The H-shaped muntin 76 (FIG. 12) by using its nut track 77 may be similarly secured to the strut 52.

Extending along the upper edge of the glass panels 28 is an identical H-shaped muntin 76 (FIG. 7) secured to the mullion frames 30 approximately sixteen inches below the beginning of the shoulder 48. The upper margin of the glass panels 28 are held in the lower socket of this muntin 76 located somewhat below the shoulder 48. This lower socket corresponds with the same respective socket as shown at 79 in FIG. 12. The upper margin of the glass glazing 28 is held in this socket 79 by a glazing wedge 74 and an opposed glazing pad 96.

Inserted into the upper socket 78 (FIG. 12) of the near-the-shoulder muntin 76 (FIG. 7) is the lower margin of a curved eave transparent double skinned acrylic glazing panel 100 commercially available under the trademark EXOLITE from CY/RO Industries or equivalent. This transparent acrylic eave panel is secured to the mullion frames 30 by glazing caps identical with the glazing cap 29 (FIG. 8) and correspondingly secured by screws 31.

The upper margin of the curved eave panels 100 are received in lower sockets (as at 79 in FIG. 12) of a muntin 76 (FIG. 7) located adjacent to the attached building 45 (FIGS. 3, 4 and 5) and secured to the top end of the mullion frames 30. These mullion frames 30 are attached to the building by a horizontal angle bar (not shown). One leg of this angle bar is strongly fastened to the sheathing and studs of the building 45, and the other leg projects out like a shelf beneath the frames 30 and is fastened to them.

Between the straight top portions 47 (FIG. 9) of the mullion frames 30 and positioned below the acrylic panels 100 are opaque roof panels 102 (FIGS. 7, 4 and 5) of the same construction as the knee wall panels 58 (FIG. 11). These insulating panels 102 are held in place by angle brackets 103 (FIG. 4) attached to the frames 30 and by transverse bars 104 (FIGS. 4, 5 and 7) attached to the frames 30.

The east and west ends of the solar greenhouse 20 can be site fabricated of conventional building materials and are well insulated.

The east or west end module 22 or 24 (FIGS. 3, 4, 5) is constructed, as shown in FIG. 7, with extruded aluminum vertical glazing bars 106 (FIG. 13) of rectangular cross section having a pair of oppositely facing outer sockets 107 and 108 with outer flanges 109 and 110 each having inturned lips 75. There are hook-shaped lips 81 on the outer corners of the rectangular section of this vertical glazing bar. This vertical glazing bar 106 advantageously includes a thermal break or isolation bridge 69 bonded in opposed C-shaped anchoring channels 70. There are screw track channels 111 and 112 in the opposite side walls of the vertical glazing bar.

The east or west end modules also include horizontal muntins 106' formed by the same members as the vertical glazing bars 106. FIG. 13 shows how such a muntin 106' is connected to a vertical glazing bar 106 by a right angle bracket 98 and self-tapping screws 99. The sockets 107 and 108 are used to receive the various wall or glazing panels by using glazing inserts, wedges, or pads associated with the lips 75 and 81. Any such socket 107 or 108 which is not used is advantageously closed by an aluminum extruded snap-fit trim clip 114 (FIG. 14). This trim clip is also thermally broken by a plastic bridge 69. It snaps in place in engagement with the inturned and hook lips 75 and 81. This snap-in trim clip 114 has an outwardly facing hook-receiving groove 91 in one flange 115 and an outwardly facing straight groove 90 in the other thermally isolated flange 116 for receiving the hook 81 and lip 75, respectively.

The muntins 106' serve as headers and are located above and below the window 23 and above the door 25.

Adjacent to and secured to the attached building 45 is a vertical wall bar 118 (FIG. 7) which is similar to one-half of a vertical glazing bar 106 (FIG. 13). This wall bar 118 includes a thermally isolated flange such as shown at 109 in FIG. 13 and a thermal isolation bridge as shown at 69 in FIG. 13.

There is a horizontal rectangular tubular aluminum member 126 (FIG. 7) fastened below a vertical triangular-shaped glazing panel 128 of the same construction as the sloping glazing 28. This member 120 may have the same construction as the header muntins 106'.

The corners of the solar greenhouse 20 are framed by gable frame members 130 (FIG. 15) having greater strength than the mullion frames 30 (FIG. 8) because the gable frame members are wider as seen by comparing FIGS. 15 and 8. The gable frames 130 include four parallel dovetail grooves 41 for holding resilient glazing pads 42 for the glazing panels 100 and 132. This panel 132 (FIGS. 4 and 5) is similar in construction to the panels 100 and is located up in the gable end near the shoulder of the eave. The gable frame 130 is connected to the muntin 76 by an angle bracket 98 and self-tapping screws 99, and there are bolts 122 whose heads are inserted in the nut track 77 (FIG. 12) of the muntin.

In order to finish the corner of the solar greenhouse 20 there is an extruded aluminum corner piece 136 (FIG. 15) secured by a self-tapping screw to the screw track 32 in the gable frame member 130. This corner piece has a dovetail groove 39 holding a glazing pad 40.

As shown in FIG. 16, in order to construct the solar greenhouse having a 6'8" N-S extent, the frame members 30 and 130 terminate at the top of the curving shoulder 48. The remaining structural members are arranged as shown in FIG. 7, taking into account the shorter N-S dimension. If a door 25 (FIGS. 3, 4 or 5) is desired, then the door is located in place of the window 23 and the insulated opaque wall panel 124 beneath this window.

In view of the foregoing description, it is to be noted that a "solar greenhouse" as used herein is defined as a greenhouse which by virtue of its optical and thermal design collects solar radiation and distributes within itself and into an accompanying building structure the resultant heat energy for the purpose of: (1) providing for its own thermal stability, and (2) for heating a portion of the structure to which it is to be attached. This definition is in direct opposition to the traditional greenhouse which, because of its poor optical design and large heat loss characteristic, will require heat from any external energy source rather than providing heat to an attached structure on net balance over the course of a year. It is, therefore, correct that in northern states, whose winters are noted for their severity, the traditional greenhouse will be an energy consumer rather than a solar energy collector/distributor. The percentage of heating load displaced from the attached structure by the solar greenhouse is defined as the "solar savings fraction". Greenhouses which have negative solar savings fractions over the period of a heating season are by definition not solar greenhouses. This application will demonstrate why the greenhouses embodying the present invention are in fact solar greenhouses, and how their design and function create a significant improvement over prior art.

In these preferred embodiments of the invention, the heat storage material in the overhead cylindrical containers is a phase change material as described in the introduction. These transparent tubes 140 are 3⅜" in outside diameter and are attractively suspended by small diameter stainless steel cables 142 held by hooks in the screw tracks 34 (FIGS. 8, 15).

There is an upper reflective thermal barrier curtain 144 (FIGS. 4 and 5) which can be pulled up by a cord running over a pulley near the ceiling bar 104. This curtain rolls onto a roller 146 (FIG. 4) located near the muntin 76 at the lower margin of the curved eave panel 100. There is a lower curtain 147 of the same construction on another roller 148 positioned near to the first roller 146. These two rollers 146, 148 unroll in opposite directions so that they are nested together with portions of the two curtains 144, 147 in overlapping relationship. The lower curtain is pulled down to the knee region 46 by a cord parallel to the inclined glazing 28 for completely blocking this glazing. The edges of the curtain fit between the gutter 38 (FIG. 8) and the glazing 28 for providing a relatively good seal against convective air currents.

As shown in FIG. 17, in the winter time at winter solstice the sun's rays 150 impinge upon the solar greenhouse at a low inclination angle A to the horizontal. For example, at the latitude of Moline, Ill., which is approximately 41.5° North Latitude, the angle A at winter solstice at midday is 25°. The year round average inclination of solar radiation there is 48.5° above the horizontal, and the angle B (FIG. 18) at summer solstice at mid-day of the solar radiation 152 is 72° above horizontal.

Advantageously, the curved transparent glazing panels 100 plus the large openings between the mullions 30 in the southern exposure allow the low inclination winter rays 80 to reach substantially the entire area of the horizontal thermal storage units 140, thereby storing thermal energy. Also, the solar radiation 150 is impinging nearby perpendicularly upon the sloping south-facing glazing panels 28, so that very little reflection occurs. Thus, maximum transmission is provided of solar thermal energy into the interior of the solar greenhouse 20 as desired for warming the interior.

By virtue of the fact that the opaque roof panels 102 are vertically spaced above the heat storage units, the solar radiation 80 is enabled to be incident upon substantially the entire area thereof during mid-winter days when the sun's arc of travel is low in the sky, but which automatically blocks the sun's radiation from increasing portions of this grid area when the sun's arc of travel is at successively higher elevations in the sky during progressive Spring changes, and conversely in the Fall.

In order to harvest the solar generated heat within the solar greenhouse 20, there is provided differential-thermostat-controlled air flow 154 driven by a motor 164 and fan 156. The warm air flow 154 passes into the building 45 for heating its interior, with the return air 158 flowing back into the lower region of the attached greenhouse.

At night in the winter the reflective thermal barrier curtains 144 and 147 are deployed for retaining heat in the solar greenhouse 20.

In order to prevent reverse thermal siphoning from the interior of the building 45 at nighttime, there is a flap valve 155 of lightweight flexible plastic sheet material which is attached to the top inside edge of the cowling 157 which surrounds the fan 156. This flap valve 155 is so light in weight, it is easily held open by the air flow 154, as shown in dashed line at 155', thereby offering essentially no impedance to the desired air flow. The arrows 160 illustrate that the heat is captured within the core region of the greenhouse at nighttime by the reflective insulation 72 and 76.

As shown in FIG. 18, during a summer day by virtue of the fact that the heat storage units 140 are horizontal and elevated with opaque roof 102 and an extendible insulation curtain 144 positioned and held above these units, they can be completely blocked from the sun's rays in the summertime while allowing sunlight to enter the greenhouse and flood the floor area 134 with pleasing summer light. This interaction between the elevated horizontal heat storage units and the extendible curtain 144 extendible above these units is synergistic in effect because it enables a greater or lesser amount of the heat storage material to be removed from participating in the passive solar heating environment, and yet this "removed" material remains in exactly the same physical location as before. A phantom removal, but a very realistic and effective one, is provided. In addition, the sun's rays are allowed to flood in upon the floor area in plentiful amount even when all of the heat storage material is being removed from direct impingement of the sun's rays by a fully extended horizontal reflective insulation barrier.

The heat storage units 140 are sized to provide 18 to 45 Btu of heat storage capacity within the solar greenhouse per average degree F. temperature change of the thermal storage means per square foot of aperture.

For maximizing harvestability of thermal energy from a solar greenhouse, the idealized 24-hour square-wave temperature cycle is shown at 190, assuming that the objective is to maintain home temperature above 65° F. The lower bound of this cycle is 45° to 55° F. and the upper bound is 75° to 85° F.

If a very large thermal mass of rocks, concrete, or water is included in the greenhouse then its temperature levels out in the range of 56° to 59° F. which is below the useful level for most human beings to be comfortable. Thus, the amount of storage in the range as discussed above is optimum.

The solar greenhouses 20 as described tend to follow the temperature curve shown dashed at 192 which approximates the idealized curve.

EXAMPLES I, II AND III

Analytical Performance Comparisons Between Prior Art Structures and Three Embodiments of this Invention Two analytical studies were performed by the inventors in connection with the present invention. The first involved a careful re-examination of candidate optical designs which might be utilized in a solar greenhouse and careful optimization studies to maximize performance. This second study was directed to optimizing the glazing-to-insulation ratio and laid the basis for comparison to prior art greenhouse structures.

There are essentially two distinctly different optical designs for greenhouses (FIGS. 1 and 2). The type "B" greenhouse was first developed in northern Europe and has existed for centuries in use. It is characterized by a generally vertical to near vertical south wall and a low roof pitch normally tilted at 15°-35° from the horizontal. The prototypical type "A" greenhouse is of modern design and illustrates the early work of the inventors. It is characterized by a single sloped glazing of approximately 50° to the horizontal and a well insulated horizontal roof structure. The embodiments of this invention as described are further improvements over the early work of the inventors.

Published work by the inventors as well as in "Performance Estimates for Attached Sunspace Passive Solar Heated Buildings" by Robert D. McFarland and Robert W. Jones of Los Alamos Scientific Laboratory, Los Alamos, New Mex. 87545 (1980), and in "Solar Energy Research at Los Alamos" compiled by Sherry K. Reisfield and Donald A. Neeper (1981) also of Los Alamos, clearly demonstrate the superiority of the "A" to the "B" geometry and establish a technical basis for the significantly improved performance that solar greenhouses embodying this invention demonstrate over the prior art structures.

The following tables and graphs utilize the correlation equations published by Los Alamos Scientific Laboratory to establish performance. The equations themselves are the product of minute by minute thermal network analysis and have been proven correct by actual measurement. Furthermore, they are a continuation of the work originally published in the Passive Solar Design Handbook (DOE/CS-0127/2) by Douglas Balcomb and published by the U.S. Department of Energy (1980). The actual calculations and computer runs utilizing the Los Alamos correlations were performed by the inventors at their own computer facility and followed the detailed methodology of Los Alamos Scientific Laboratories.

The optical performance of a solar collector, i.e., a solar greenhouse is a function of the following factors: (1) shape (the square angle of the altitude of the sun to the greenhouse in any month); (2) the transmission through the glazing of the incident solar radiation impinging on the glazing; and (3) the absorption of the solar radiation onto the interior surfaces of the greenhouse followed by heat generation.

The shape factor is a direct function of greenhouse geometry. As the average glazing angle of the greenhouse nears vertical, more solar radiation will be incident on the outer glazing surface in the winter than in summer due to the angle of the sun to the glazing surface, a function of the apparent altitude of the sun changing with the seasons. Conversely, a shallow (near horizontal) glazing angle when the sun is high in the sky, such as in summer, will increase the quantity of incident (again by geometry) radiation and, therefore, promote seasonal overheating and underheating when compared with the more thermally stable "A" geometry. This difference resulting from "A" and "B" is clearly seen in Table 1, line 1, and titled "Incident Radiation divided by Horizontal Radiation". The "A" geometry greenhouse has a greater ratio of radiation actually impinging on it to the radiation which would have struck the ground upon which it was built. The "A", therefore, sees more radiation in spite of the fact that the "B" has equal glazing area and a far smaller horizontal area, which smaller horizontal area tends to inflate "B's" ratio since it initially provides a smaller denominator for the ratio. The "A", therefore, is geometrically more efficient. This advantage persists in spite of changes in latitude or weather as demonstrated by the presentation of data from Burlington, Vt. and Yuma, Ariz.,—two cities not only dissimilar in latitude but also radically different in atmospheric clarity as shown by their $KT\alpha$'s.

The ratio of transmitted radiation to incident radiation is a function of two variables: (a) the refractive index of the glass and its overall optical density; and (b) the angle of incidence of the sun to the glazing surface. Glass is not 100% transparent as will be demonstrated. Multiple glazing layers do cut down on the fraction of radiation that will be transmitted through the glazing. However, if it is assumed that the type "A" and "B" geometries are both double glazed and have equal material characteristics, then it is only the second variable which influences transmittance. The more efficient design has greater transmittance in mid-winter due to optimization of the glazing angle to the lower solar altitude in winter.

TABLE 1

Comparison of Component Optical Ratios for Type A and B Greenhouses in January for Two Cities

| City | Burlington, VT | | Yuma, Arizona | |
|---|---|---|---|---|
| Type | A | B | A | B |
| Incident Radiation/ Horizontal Radiation | 2.449 | 2.163 | 2.477 | 2.152 |
| Transmitted Radiation/ Incident Radiation | .702 | .697 | .700 | .695 |
| Absorbed Radiation/ Transmitted Radiation | .800 | .736 | .797 | .734 |
| $KT_\alpha$* | .368 | .368 | .655 | .655 |

*$KT_\alpha$ equals monthly radiation on horizontal terrestrial surface divided by monthly extraterrestrial horizontal radiation, i.e., a function of cloudiness.

The final ratio described in Table 1 is the ratio of absorbed radiation to transmitted radiation. If it is assumed that the quantity of radiation transmitted is equal in geometry "A", as well as "B", then the absorbed energy is a function of overall "blackness" of the interior wall surfaces. If these are also assumed to be equal at 90% absorptance for the back wall, 80% for floor and 30% for all other surfaces (80-90% absorptance is an extremely dark color) then the only difference which might be seen between the overall effective (net) absorptances of geometries "A" and "B" is that caused by reflection from surfaces at inefficient angles to incoming beam and diffuse radiation. A difference is in fact noted. The "A" type, on average, is a better effective absorber by 8%.

Table 2 illustrates the sum of the effects from geometry, transmittance, and absorptance in a single ratio, i.e., the ratio of absorbed radiation to horizontal radiation which would have impacted the ground upon which the greenhouse was built. Eight cities are listed demonstrating widely differing latitudes and hence declination angles and significantly different climates. The reader should note that in all cases the type "A" greenhouse has a 23-27% advantage in optical performance over the type "B" greenhouse. This overall significant advantage occurs in spite of the fact that the "B" greenhouse modeled has some apparent initial advantages by minimizing horizontal area and maximizing glazed area over the "A" type.

TABLE 2

Ratio of Useful Absorbed to Ambient Horizontal Radiation for Type A and B Greenhouses in Eight Cities for the Month of January

| | Type A* | Type B* | Type A/Type B** |
|---|---|---|---|
| Burlington, VT | 1.364 | 1.106 | 1.233 |
| New York, N.Y. | 1.330 | 1.071 | 1.242 |
| Washington, D.C. | 1.316 | 1.056 | 1.247 |

TABLE 2-continued

Ratio of Useful Absorbed to Ambient Horizontal Radiation for Type A and B Greenhouses in Eight Cities for the Month of January

|  | Type A* | Type B* | Type A/Type B** |
|---|---|---|---|
| Seattle, WA | 1.311 | 1.065 | 1.231 |
| Denver, CO | 1.602 | 1.295 | 1.237 |
| Yuma, AR | 1.402 | 1.108 | 1.265 |
| New Orleans, LA | 1.167 | .913 | 1.276 |
| Rochester, N.Y. | 1.275 | 1.028 | 1.240 |

*Ratio of total absorbed/total horizontal radiation
**Ratio of column 1 divided by columm 2

It is the actual, mathematically modeled. comparison of the embodiments of this invention to high quality prior art greenhouse structures which fully reveals the significant advantages in performance of embodiments of the present invention over the prior art.

The optical correlations developed by Los Alamos Scientific Laboratories were used in the actual comparison (without correction for less than theoretical aspects of the commercial greenhouses studied). This non-correction for actual-less-than theoretical gives full advantage to the commercial "B" type greenhouses illustrated and creates a liberal, upper bound estimate for their performance. It will be shown, however, that optical performance is only one parameter leading to total efficiency and that the present invention springs from discoveries of other more important parameters and addresses the implications of these parameters, previously left unrecognized and unaddressed by prior art structures.

Three products were compared against three embodiments of the invention. All were chosen to be approximately 24 feet long, 10 feet wide and 9.5 feet tall, although each individual product varied slightly from the nominal sizes. The products selected were those denoted as "solar greenhouses" by their manufacturers and each employed type "B" geometry.

(1) Commercial Model X with straight eave and single glazing (glass). Dimensions approximately 23.3' (L)×9.9' (W)×9.1' (H) having a 76° front wall and 15° glazed roof pitch with glazed east and west end vertical walls.

(2) Commercial Model Y with double glazing (glass). Dimensions approximately 22.5' (L)×10' (W)×10' (H) having a vertical front wall and 19° glazed roof pitch with glazed east and west end vertical walls.

(3) Commercial Model Z with triple glaxing (glass). Dimensions approximately 23.2' (L)×10.3' (W)×9.1' (H) having a vertical front wall and a 14° glazed roof pitch with glazed east and west end vertical walls.

The three embodiments of this invention have dimensions of 23.7' (L)×10' (W)×9.5' (H) and are glazed so that the 60° south wall when adjusted for the curve has an overall glazing angle of approximately 50°. Furthermore, as explained earlier, the embodiments of this invention can be furnished without a thermal curtain and double-glazed (Embodiment 1), with a thermal curtain and double-glazing (Embodiment 2), or with a thermal curtain, double glazing, and because of its structural integrity, without manufactured end walls, which are assumed to be site built during installation and insulated to an R factor of 21.2 (Embodiment 3).

All greenhouses were assumed to have thermal storage per the Los Alamos correlations and installed due south contiguous to a modern well insulated 1500 ft.$^2$ house consuming 4 BTU's per ft.$^2$ degree day and occupied by three people whose average lifestyle and appliances generate 60,000 BTU's per day of waste heat (527 kw.hrs/month).

The glazing areas of the prior art ("B" type) greenhouses and of the first and second Embodiments of the present invention ("A" type) are listed in Table 3. Although each greenhouse might appear to be approximately the same size, as discussed previously, there exist significant differences in their actual glazed areas. For example, the total glazed areas of the prior art greenhouses are between 34–79% larger than in these embodiments of the invention. One might conclude that the advantage in glazed area would yield an advantage in solar energy collected; however, the useful aperture of collection is that area projected on a vertical south wall from the top of the ground or kneewall to the top of the greenhouse glazing.

TABLE 3

|  | Length | Total Glazed* Area (ft$^2$) | Ratio of E-W Glazed* Area to Total Glazed Area | Solar** Aperture (ft$^2$) | Ratio of Solar Aperture to South Glazed Area |
|---|---|---|---|---|---|
| Model X | 23.3 | 415.1 | 0.242 | 141.4 | .449 |
| Model Y | 22.5 | 549.6 | 0.300 | 206.3 | .536 |
| Model Z (Triple Glazed) | 23.2 | 555.1 | 0.287 | 193.4 | .489 |
| Embodiment 1 and Embodiment 2 | 23.7 | 310.6 | 0.170 | 171.4 | .655 |

*Gross glazed area including mullions
**Net aperture with mullion area deleted

Consequently, the embodiments of this invention have an aperature ranging from 18% greater to 20% less than the prior art and not 34–79% less. The excess glazing area in Models X, Y and Z only leads to additional heat loss,—not solar gain.

The ratio of east and west glazed area to the total glazed area also should be noted. Our studies have shown that greater than 18% east and west glazing leads to excessive heat loss at night while providing little useful gain during the day. Because of the motion of the earth to the sun during the winter, east and west glazing is a totally inefficient collector and only leads to overheating during the summer months. The balance and usage of east and west glazing should only be a function of horticultural necessity which is well provided for at the 18% level.

The ratio of solar aperture to south glazed area in the last column of Table 3 is an important parameter and indicator of glazing efficiency. By optimizing volume and maximizing this ratio, the overall glazing efficiency is increased. A low ratio indicates excess glazing and, therefore, greater heat loss relative to solar collection. The prior art structures are clearly less efficient than these embodiments of the invention.

Table 4 lists the glazing "U" factors and resultant Total Greenhouse Load (heat loss/hour·°F.) for each greenhouse. Besides glazing loss, factors taken into consideration were infiltration (assumed to be 0.5 air changes per hour for all greenhouses), perimeter losses from an insulated slab (0.2 BTU's/FT.·°F.·hr for all greenhouses) and losses due to the insulated wall panels.

TABLE 4

| | "U" Factor of Glazing | Total Greenhouse Load* (BTU/°F. · HR) | Normal Transmittance | Total Load/ Aperture Ratio** |
|---|---|---|---|---|
| Model X | 1.13 | 554.1 | .864 | 3.39 |
| Model Y | .55 | 334.3 | .747 | 1.62 |
| Model Z (Triple Glazed) | .36 | 232.2 | .646 | 1.39 |
| Embodiment #1 | .55 | 213.7 | .747 | 1.25 |
| Embodiment #2 | .55/.19 | 150.5 | .747 | 0.89 |
| Embodiment #3 | .55/.19 | 124.4 | .747 | 0.73 |

*Includes glazing loss as well as loss due of infiltration (½ an air change per hour assumed), and conduction (out of perimeter (.2 BTU's per ft/°F.), kneewall and/or insulated panels, etc., as provided by manufacturer).
**The greenhouse load aperture ratio is corrected for transmittance using double glazing as the norm.
***Embodiment 1 is the solar greenhouse as described without a night curtain (E1).
Embodiment 2 is Embodiment 1 (E1) plus an R 3.4 night curtain deployed 15 hours per day for reducing "U" to 0.19 at night (E2).
Embodiment 3 is E2, with the modular end walls described, replaced with R21.2 site fabricated end walls (E3).

Adjustments for use of the thermal curtain were made for Embodiments 2 and 3 of the present invention. It is clearly shown in Table 4 that the first embodiment of the present invention, even without the use of a thermal curtain, is a significant improvement over the first two prior art products.

The commercial Model Z greenhouse illustrates an extremely important concept which must be accounted for in optical design. The transmittance of a beam of sunlight normal to the glazed surface must be maximized for ideal optical efficiency. The Model Z product uses triple glazing to lower overall heat loss. Triple glazing is 14% less transparent than double glazing. By decreasing heat loss in this manner, the Model Z product has cut overall collection efficiency an additional 14%.

In our view, the last column in Table 4 lists the single most important parameter with which one can characterize overall solar greenhouse performance, namely, the ratio of total greenhouse load to the total solar aperture. This ratio of total-load-to-solar-aperture leads to the dollars gain (or loss) to the owner of the attached house resulting from use of the solar greenhouses. These embodiments of the invention are clearly superior to these prior art structures. When one combines the total-load-to-aperture ratio with an accounting for the optical efficiencies and differences of type "A" versus "B" designs and adds the detailed weather and geographical data necessary to run the complete Los Alamos correlations, a resultant judgment based on BTU's gained (dollars saved) or BTU's lost (dollars lost) can be made between the prior products and these embodiments of the invention.

Computer runs were generated for 10 cities of varying geographical location and weather patterns. Two results were produced. Table 5 lists the output of two prior art structures, and of two embodiments of the invention. The values are presented in thousands of BTU's generated per season per square foot of solar aperture. It is clear from this data that when Y and Z are attempted to be used in at least two northern cities, where heat is of major concern, the prior art "solar greenhouses" do not provide net heating at all but actually drain heat and require heat if a seasonal minimum temperature of at least 45° F. is to be maintained inside of the greenhouse. In most northern cities, Embodiment 1 is at least twice as effective as the prior art. In a relatively warm city, such as San Francisco, the differences diminish. However, across the United States, in cities having substantial heating seasons, Embodiments 1 and 2 of the invention are clearly superior to the prior art. It should be noted that significant further increases in performance arise from cutting heat loss by means of a thermal curtain. This increase is, of course, most pronounced when the average winter temperatures are lowest.

TABLE 5

Net Yield in Thousands of BTUs/FT$^2$ of Aperture · Year*

| Cities | Model Y | Model Z (Triple Glazed) | Embodiment #1 | Embodiment #2 |
|---|---|---|---|---|
| Burlington, VT | −30.7 | −11.7 | 8.5 | 25.2 |
| Cleveland, OH | −13.9 | −0.7 | 16.7 | 28.4 |
| New York, NY | 2.8 | 11.4 | 28.7 | 42.3 |
| Rapid City, SD | 7.1 | 19.7 | 47.4 | 68.3 |
| Seattle, WA | 9.0 | 16.8 | 32.7 | 43.8 |
| Washington, DC | 8.3 | 16.3 | 35.7 | 50.0 |
| Portland, OR | 10.9 | 17.6 | 33.1 | 42.8 |
| Topeka, KA | 15.1 | 22.5 | 44.3 | 60.6 |
| San Francisco, CA | 43.8 | 41.6 | 51.8 | 52.9 |
| Denver, CO | 40.8 | 45.9 | 76.1 | 100.3 |

*Assumes Greenhouses are attached to a 1500 ft$^2$ house normally consuming 4 BTU/FT$^2$ · Degree Day · Year and having an internal gain of 60,000 BTU's per day generated by 3 person occupancy and associated appliances. Greenhouses are assumed to be 24' long (nominal) and equipped as previously discussed.

Figure 20:
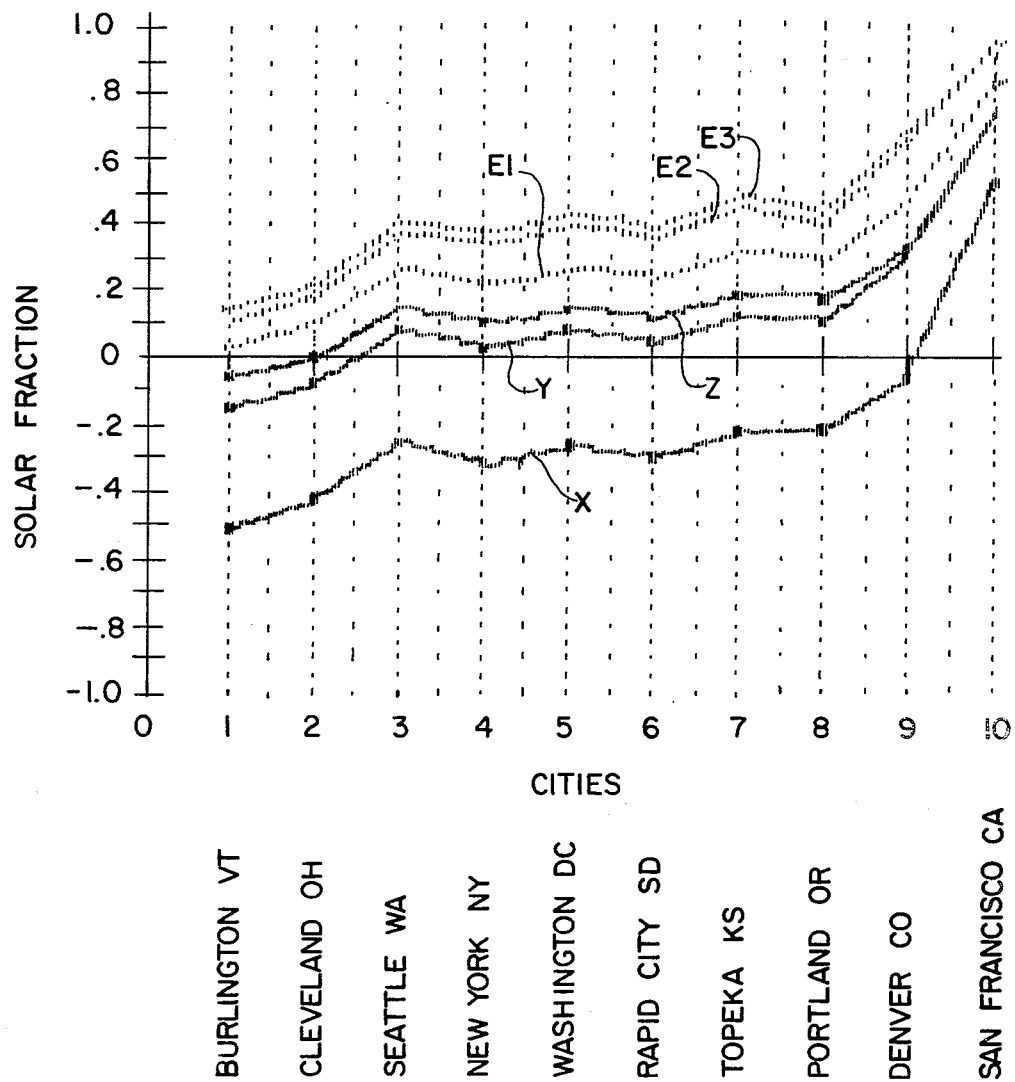
FIG. 20 is an analytical plot.

The computer plot (FIG. 20) illustrates in graphical form the percentage savings (solar savings fraction) that would accompany the installation of the three prior art structures and the three embodiments (E1, E2 and E3) of the invention. "Solar savings fraction" or "solar fraction" means the percentage savings in total, annual home heating bill. It is to be noted that in a harsher winter climate, where the annual home heating costs are larger, a smaller solar savings fraction will often mean a larger dollar savings to the owner, than a larger solar savings fraction in a milder winter climate, where the annual home heating costs are considerably smaller. The three type "B" prior art structures in harsh climates will actually cost their owners money resulting from increased heating fuel bills. The single glazed unit Model X experiences extremely high heat loss due to the single layer of glass. The only significant areas in which the prior art greenhouses show significant solar savings as compared with the present invention are in areas of extreme atmospheric clarity (Denver) or warm climates (San Francisco). These areas are insignificant when viewed against the whole area of the United States and the overall U.S. energy demand.

The plot (FIG. 20) clearly demonstrates that a solar greenhouse must be of geometry "A" and have a minimum total load to aperture ratio for an adequate energy yield or solar savings fraction to be generated. Furthermore, the various embodiments of the present invention as compared above strengthen the argument for minimized load to aperture ratios. In addition, the prior art greenhouses fail to optimize the parameters defined herein by the inventors and hence the embodiments of this invention are a totally new class of truly "solar greenhouses". The embodiments of the invention perform even better than the comparisons based upon the Los Alamos correlation, because the overhead storage units perform superiorly to the thermal storage of undefined thermal mass (concrete, stone, water, etc.) having a heat capacity of 45 Btu's per square foot of aperture.

The reflective thermal curtains 144 and 147 as shown are formed by laminating two alumunized Mylar sheets to a central polyester scrim sandwiched between these two reflective Mylar sheets. Then each layer of aluminized Mylar is in turn covered with an outer layer of S-type Mylar.

From the foregoing, it will be understood that the various embodiments of the present invention are well suited to provide the advantages set forth, and since many possible embodiments may be made of the various features of this invention and as the systems and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features all without departing from the scope of the invention as defined in the following laims and reasonable equivalents of the claimed elements. It is to be noted that the solar greenhouse frame structure as described will advantageously receive and hold any transparent, translucent, or opaque glazing materials or panels which have a thickness at the margins of ⅜". They can be rabbeted to create this margin thickness. Therefore, the glazing materials or panels can be interchanged for optimizing the solar performance of each greenhouse to the specific localized climate conditions at the site where it is located. For example, in some cases the opaque kneewalls 58 can be replaced with transparent or translucent glazing. Such replacement serves to enhance performance in those parts of the country which experience long periods of sunshine and moderate temperatures.

Another real advantage of this strong solar greenhouse frame structure and of its geometry is that the curved shoulder region has both the strength and proper angle to mount a conventional solar water heater inside of the greenhouse structure. Thus, the homeowner can save additional money by using this solar greenhouse to enclose a domestic solar hot water heater. Furthermore, this positioning of the solar water heater inside of this solar greenhouse will in many cases avoid the need to use anti-freeze liquid and heat exchangers in the solar water heating system.

Also, it is to be noted that a heat pump hot water heater can be employed to use solar energy coming into the interior of this solar greenhouse at those times of the year when the incoming solar energy exceeds the heating needs of the attached building. In effect, the excess incoming energy is transformed into a useful purpose, i.e. heating domestic hot water, rather than being discharged to ambient.

Furthermore, during those periods of the year when home heating is required but the solar greenhouse temperatures are in the range of 45° F.–68° F., the heat content of the air in the solar greenhouse can be extracted and put to use for heating domestic hot water.

By virtue of the fact that the plastic glazing 100 extends up to the attached building, the opaque insulated panels 102, which are easily removable, can in fact be removed at any time desired for allowing more sunlight to enter this solar greenhouse. In other words, the structural integrity of the solar greenhouse is not affected by insertion or removal of the overhead insulating panels 102. Thus, a great flexibility is provided in light and heat control.

It is to be noted that the curved translucent diffusing glazing 100 can be fabricated from other materials than acrylics. For example, this curved translucent light diffusing glazing 100 can be fabricated from acrylics, polycarbonates, styrenes, vinyls, fiberglass reinforced polyesters, frosted glass.

Plants grow more uniformly in the presence of diffused bright light as distinct from direct bright light, which casts sharp shadows and can cause localized leaf damage. Thus, the solar greenhouse structure as described herein is advantageous for encouraging uniform plant growth. The advantages are both horticultural and thermal. A person in the greenhouse in direct sunlight can become uncomfortably warm in those areas of the body on which the direct sunlight impinges, because the person's body is acting as the transfer medium between light and heat energy in a concentrated fashion. Conversely, the same person under the translucent diffusing glazing 100 will experience a pleasant uniform warmth. In our experience it is novel to provide curved overhead translucent diffusing glazing with optically transparent glazing beginning just above eye level and extending downwardly for human vision and enjoyment when standing at floor level.

We claim:

1. A system for heating a home or other building containing living space in the northern hemisphere using solar energy to provide a significant portion of the annual heating effect comprising:

a solar greenhouse having a top portion adapted to be attached to the southerly facing side wall of a building at a predetermined distance above the floor level of the greenhouse, said solar greenhouse having a transparent eave region adapted for facing in a southerly direction for sloping downwardly and outwardly in a direction away from the building, said transparent eave region being multiple glazed, a plurality of mullions extending downwardly in a southerly direction from said eave region for sloping downwardly and outwardly away from the building at an angle in the range from 50° to 70° to the horizontal, being a steeper slope than the average slope of said eve region, at least one multiple-glazing transparent window mounted between and being supported by a pair of said mullions, said window sloping downwardly and outwardly in a southerly direction at the same angle as said mullions, said multiple glazing window facing in a southerly direction, said multiple glazing of the eave region plus said multiple glazing of the window having an average "U" factor of no more than 0.56 Btu per square foot, per hour, per °F. difference between the inside and outside temperature, said solar greenhouse having a front vertical region forming a kneewall below said window, said front vertical region extending down from the bottom of said window to the floor level and having thermal insulation at least equal to one inch of insulating foam, said solar greenhouse containing thermal storage mass in addition to the structural components of the greenhouse, said thermal storage mass providing a storage capability per square foot of southerly facing transparent glazing material in the range from 18 to 45 Btu of heat capacity per average degree F. temperature change of the storage mass, said thermal storage mass being supported in said solar greenhouse at an elevation above reasonable headroom level and being positioned for solar radiation to impinge thereon during the normal heating season for said building, the northerly side of said solar greenhouse being adapted to be defined by said southerly facing side wall of the building, said northerly side having an opening therein at an elevated location for providing communication at said elevated location between the interior of said greenhouse structure and said living space for circulating solar energy heated warm air from the interior of said solar greenhouse into said living space, said northerly side having provision for return circulation of air from the living space into the interior of said solar greenhouse near the floor, fan means for producing said circulation, control means for controlling the operation of said fan means, said control means including first and second sensing means, said first sensing means being positioned within said living space at a location for providing sensing of air temperature representative of the actual air temperature in said living space, said second sensing means being positioned at an elevated location in the interior of said solar greenhouse and being responsive to the air temperature at said elevated location, said control means actuating said fan means whenever the air temperature in the interior of the solar greenhouse at said elevated location exceeds a predetermined differential in temperature above the actual temperature of the air being sensed by said first sensing means for harvesting useful solar energy heated air from said solar greenhouse into said living space.

2. A solar heating system for heating a home or other building containing living space as claimed in claim 1, in which:

said multiple glazing in said window is low iron glass.

3. A solar heating system for heating a home or other building containing living space as claimed in claim 2, in which:

said window is triple glazed with low iron glass.

4. A solar heating system for heating a home or other building containing living space as claimed in claim 1, in which said thermal storage mass comprises a plurality of spaced horizontally extending rigid plastic tubular containers with thermal storage material therein.

5. A solar heating system for heating a home or other building containing living space as claimed in claim 4, in which:

said tubular containers are arranged with their axes parallel and lying in two horizontal planes.

6. A solar heating system for heating a home or other building containing living space as claimed in claim 1, 2, 3, 4 or 5, in which:

said fan means causes the air to flow past said thermal storage means as said fan circulated air is flowing from the interior of said solar greenhouse toward said opening.

7. A solar heating system for heating a home or other building containing living space as claimed in claim 1, 2, 3, 4 or 5, in which:

said predetermined temperature differential is at least 3° F.

8. A solar heating system for heating a home or other building containing living space as claimed in claim 1, 2, 3, 4, or 5, in which:

light weight plastic sheet material is secured along its upper edge near said opening, said plastic sheet material being so light in weight that it is easily blown open by the fan circulation for offering insignificant impedance to fan circulation of air through said opening into the building, and said plastic sheet material acting as a flap valve for preventing reverse thermal circulation of air through said opening at night time.

9. A solar heating system for heating a home or other building containing living space as claimed in claim 1, in which:

said multiple glazed transparent eave region is curved convex outwardly with the upper margin thereof overlapping said top portion and with the lower margin thereof near the top of said window being aligned with said window.

10. A solar heating system for heating a home or other building containing living space as claimed in claim 1, 2, 3, 4, 5 or 9, in which:

said mullions include upturned flange-like gutters projecting from their inner edges and spaced inwardly from said multiple glazed window for catching any condensate running down said mullion, said window having a sill below the lower margin of said window, said sill being located above said front vertical region of the greenhouse, and said sill including means for catching and disposing of the condensate running down said gutters.

11. A solar heating system for heating a home or other building containing living space as claimed in claim 1, 2, 3, 4, 5 or 9, in which:

said top portion of said solar greenhouse includes a thermally insulated roof panel positioned below the top region of said curved eave panel extending between the southerly facing side wall of the building and said eave region, and said roof panel has a "U" factor of no more than 0.083.

12. A solar heating system for heating a home or other building containing living space as claimed in claim 1, 2, 3, 4, 5 or 9, in which:

the glazed area of said solar greenhouse has an overall average "U" factor of no more than 0.56 without the deployment of movable thermal insulation at nighttime.

13. A solar heating system for heating a home or other building containing living space as claimed in claim 1, 2, 3, 4, 5, or 9, in which:
said solar greenhouse has easterly and westerly walls each containing some glazing, and
wherein the ratio of the area of southerly facing glazing to the sum of the easterly and westerly facing glazing area is at least 2.2.

14. A solar heating system for heating a home or other building containing living space as claimed in claim 9, in which:
thermal barrier curtain means are provided which can be extended diagonally inside of said convex multiple glazed eave region between the upper and lower margins thereof during night in the winter for retaining solar thermal energy in the interior of said solar greenhouse at night.

15. A solar heating system for heating a home or other building containing living space as claimed in claim 14, in which:
said thermal barrier curtain means are reflective on the outside thereof and can be extended diagonally between said thermal storage mass and said convex multiple glazed eave region between said upper and lower margins thereof during daytime in the summer for excluding solar thermal radiation from said storage mass in the summer.

16. A solar heating system for heating a home or other building containing living space as claimed in claim 14 or 15, in which:
thermal barrier curtain means can be extended between said window and the interior of said solar greenhouse during night in the winter for retaining solar thermal energy in the interior of said solar greenhouse at night.

17. A solar heating system for heating a home or other building containing living space as claimed in claim 16, in which:
said gutters are formed by a protective, decorative strip snapped over the inside surface of each mullion and projecting beyond the edge of the mullion for providing an attractive appearance, for protecting the mullion surface from marking as well as for providing said gutters.

18. A solar heating system for heating a home or other building containing living space as claimed in claim 15, in which:
the glazed area of said solar greenhouse has an overall "U" factor at night of no more than 0.20 when said thermal barrier curtain means are deployed at night.

19. A solar greenhouse having a floor area and containing thermal storage means in addition to the structural components of the greenhouse,
said thermal storage means being supported in said solar greenhouse at an elevation above reasonable headroom level,
said floor area being larger in area than the horizontal extent of said thermal storage means and extending south farther than the southern limit of said thermal storage means,
a front region of transparent glazing extending downwardly from a level near the southern limit of said thermal storage means to a level near the southern limit of said floor area, said front region of glazing sloping downwardly and outwardly in a southerly direction,
an insulated opaque roof, said insulated roof being spaced above said thermal storage means, said thermal storage means extending farther south than the southern limit of said roof,
an upper region of transparent glazing extending downwardly from the southern limit of said roof to the upper limit of said front region, said upper region of transparent glazing having an average slope less steep than said front region,
enclosure means enclosing the east and west ends of said solar greenhouse,
movable insulation barrier means mounted above said heat storage means, said barrier means being spreadable generally between said heat storage means and said upper region of transparent glazing during cold nights for extending an insulation barrier above said heat storage means for retaining heat energy in said solar greenhouse during cold nights,
movable insulation barrier means being spreadable generally downwardly from the southern limit of said upper transparent glazing to a level near the bottom of said front region of transparent glazing during cold nights for retaining heat energy in said solar greenhouse during cold nights,
the north side of said greenhouse structure being adapted to be mounted adjacent to a home or other building containing living space to be heated by solar energy,
said north side having at least one opening therein in a position above the level of said heat storage means for providing communication between the interior of said solar greenhouse and said living space for circulating solar energy heated warm air from the interior of said greenhouse into said living space,
said north side also providing communication between said living space and said greenhouse structure at a position near the level of said floor area for return circulation of cooler air from said living space into said greenhouse structure,
fan means for producing said circulating of solar heated air into said building,
control means for controlling the operation of said fan means,
said control means including first and second sensing means,
said first sensing means being adapted to be positioned within said living space at a location for providing sensing of air temperature representative of the actual air temperature in said living space,
said second sensing means being adapted to be positioned at an elevated location in the interior of said solar greenhouse for being responsive to the air temperature at said elevated location,
said control means actuating said fan means whenever the air temperature in the interior of the solar greenhouse at said elevated location reaches a predetermined differential in temperature above the actual temperature of the air being sensed by said first sensing means for harvesting useful solar energy heated air from said solar greenhouse into said living space.

20. A system for heating a home or other building containing living space as claimed in claim 19, in which:
said fan means circulates air past said thermal storage means as said fan circulated air is flowing from the interior or said solar greenhouse toward said opening.

21. A system for solar heating a home or other building containing living space as claimed in claim 19 or 20, in which:
said thermal storage means has a thermal storage capacity for each square foot of southerly facing transparent glazing in the range from 18 to 45 Btu of heat capacity per average degree F. temperature change of said thermal storage means per square foot of aperture.

22. A system for solar heating a home or other building containing living space as claimed in claim 19 or 20, in which:
said predetermined differential in temperature is approximately 3° F.

* * * * *